United States Patent
White

(10) Patent No.: US 9,056,674 B2
(45) Date of Patent: Jun. 16, 2015

(54) DETACHABLE ROTOR BLADE FAIRING APPARATUS AND METHOD

(75) Inventor: Robert Owen White, Orillia Ontario (CA)

(73) Assignee: GROEN BROTHERS AVIATION, INC., Salt Lake City, UT (US)

( * ) Notice: Subject to any disclaimer, the term of this patent is extended or adjusted under 35 U.S.C. 154(b) by 690 days.

(21) Appl. No.: 13/283,461

(22) Filed: Oct. 27, 2011
(Under 37 CFR 1.47)

(65) Prior Publication Data

US 2012/0156050 A1 Jun. 21, 2012

Related U.S. Application Data

(60) Provisional application No. 61/409,487, filed on Nov. 2, 2010.

(51) Int. Cl.

| | |
|---|---|
| *B64C 11/06* | (2006.01) |
| *B64C 11/24* | (2006.01) |
| *B64C 15/14* | (2006.01) |
| *B64C 27/473* | (2006.01) |
| *B64C 27/82* | (2006.01) |
| *B64C 27/18* | (2006.01) |
| *B64C 27/22* | (2006.01) |
| *B64C 27/26* | (2006.01) |
| *B64C 11/20* | (2006.01) |

(52) U.S. Cl.
CPC ......... *B64C 27/473* (2013.01); *Y10T 29/49318* (2015.01); *B64C 11/06* (2013.01); *B64C 11/24* (2013.01); *B64C 11/20* (2013.01); *B64C 15/14* (2013.01); *B64C 27/22* (2013.01); *B64C 27/82* (2013.01); *B64C 2027/8245* (2013.01); *B64C 27/18* (2013.01); *B64C 27/26* (2013.01)

(58) Field of Classification Search
CPC ........ B64C 27/18; B64C 11/04; B64C 11/06; B64C 11/20; B64C 11/24; B64C 13/30; B64C 15/14; B64C 27/22; B64C 27/26; B64C 27/473; B64C 27/82; B64C 2027/8245; Y10T 29/49318
USPC ...... 416/62, 90 A, 90 R, 92, 226, 232; 244/6, 244/17.11, 23 R, 123.1, 123.14
See application file for complete search history.

(56) References Cited

U.S. PATENT DOCUMENTS

| | | | | |
|---|---|---|---|---|
| 1,947,901 | A | * | 2/1934 | De La Cierva .................... 244/8 |
| 2,352,342 | A | * | 6/1944 | Pitcairn ......................... 416/102 |
| 2,460,351 | A | * | 2/1949 | Hoffman et al. .............. 416/145 |
| 2,568,230 | A | * | 9/1951 | Gluhareff ...................... 416/225 |
| 2,574,980 | A | * | 11/1951 | Meyers ......................... 416/226 |

(Continued)

*Primary Examiner* — Edward Look
*Assistant Examiner* — Christopher R Legendre
(74) *Attorney, Agent, or Firm* — Pate Baird, PLLC

(57) ABSTRACT

A rotor blade having a detachable fairing is disclosed. The rotor blade includes leading and trailing edge fairings secured to the blade spar and one or more control lines extending between of the fairings and the blade spar. A detachable fairing extends from one or both of the leading and trailing edge fairings toward one of the distal and proximal ends of the blade spar. The detachable fairing and blade spar form an airfoil contour. The detachable fairing may secure to a tip jet attachment fitting at a distal end of the blade spar. A mounting structure including upper and lower plates may secure near a proximal end of the blade spar and the detachable fairing may secure to both the upper and lower plates to form all or part of an airfoil contour. The mounting structure may include a spherical seat engaging a spherical surface of a hub shroud.

19 Claims, 26 Drawing Sheets

(56) References Cited

U.S. PATENT DOCUMENTS

| | | | | |
|---|---|---|---|---|
| 2,601,463 | A | 6/1952 | Stanley | |
| 2,606,728 | A * | 8/1952 | Sikorsky | 244/134 B |
| 2,754,915 | A * | 7/1956 | Echeverria, Jr. | 416/226 |
| 2,954,828 | A * | 10/1960 | Marchetti | 416/226 |
| 2,981,337 | A * | 4/1961 | Stuart, III | 416/226 |
| 3,096,826 | A * | 7/1963 | Amer et al. | 416/20 R |
| 3,333,642 | A * | 8/1967 | Kee | 416/226 |
| 3,402,772 | A * | 9/1968 | Sobanik | 416/144 |
| 3,494,424 | A | 2/1970 | Stanley | |
| 4,589,611 | A | 5/1986 | Ramme et al. | |
| 4,704,240 | A | 11/1987 | Reavely et al. | |
| 5,131,834 | A | 7/1992 | Potter | |
| 5,301,900 | A * | 4/1994 | Groen et al. | 244/17.25 |
| 5,934,873 | A | 8/1999 | Greene | |
| 6,659,722 | B2 | 12/2003 | Sehgal et al. | |
| 7,147,182 | B1 | 12/2006 | Flanigan | |
| 7,740,452 | B2 * | 6/2010 | Mueller et al. | 416/226 |
| 2008/0157429 | A1 | 7/2008 | Callis et al. | |
| 2010/0266416 | A1 | 10/2010 | Marshall et al. | |
| 2010/0288513 | A1 | 11/2010 | Turley et al. | |
| 2012/0156050 | A1* | 6/2012 | White | 416/226 |
| 2014/0072431 | A1* | 3/2014 | Smith et al. | 416/170 R |

* cited by examiner

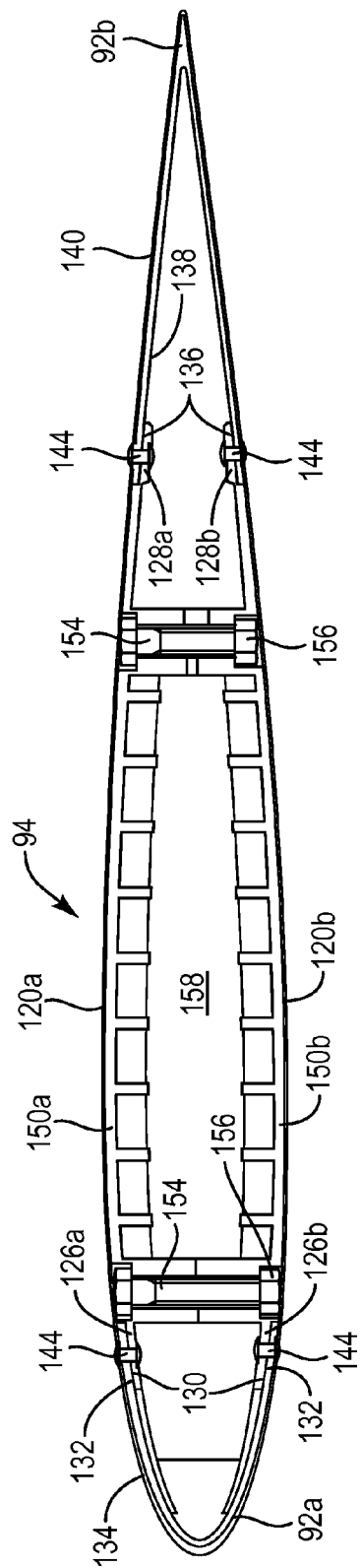
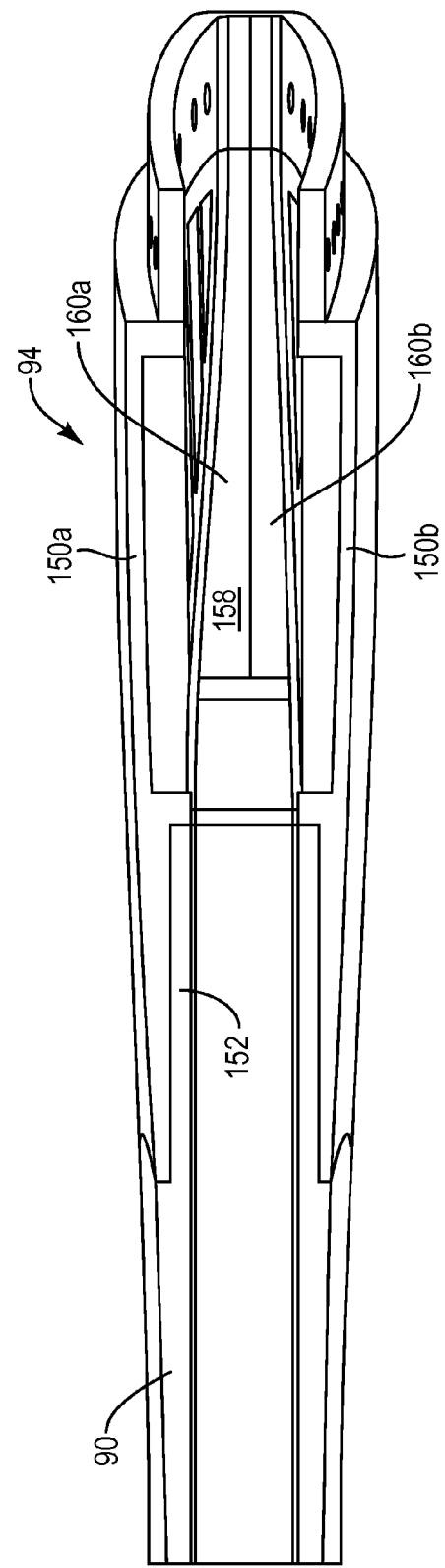
FIG. 7A
FIG. 7B

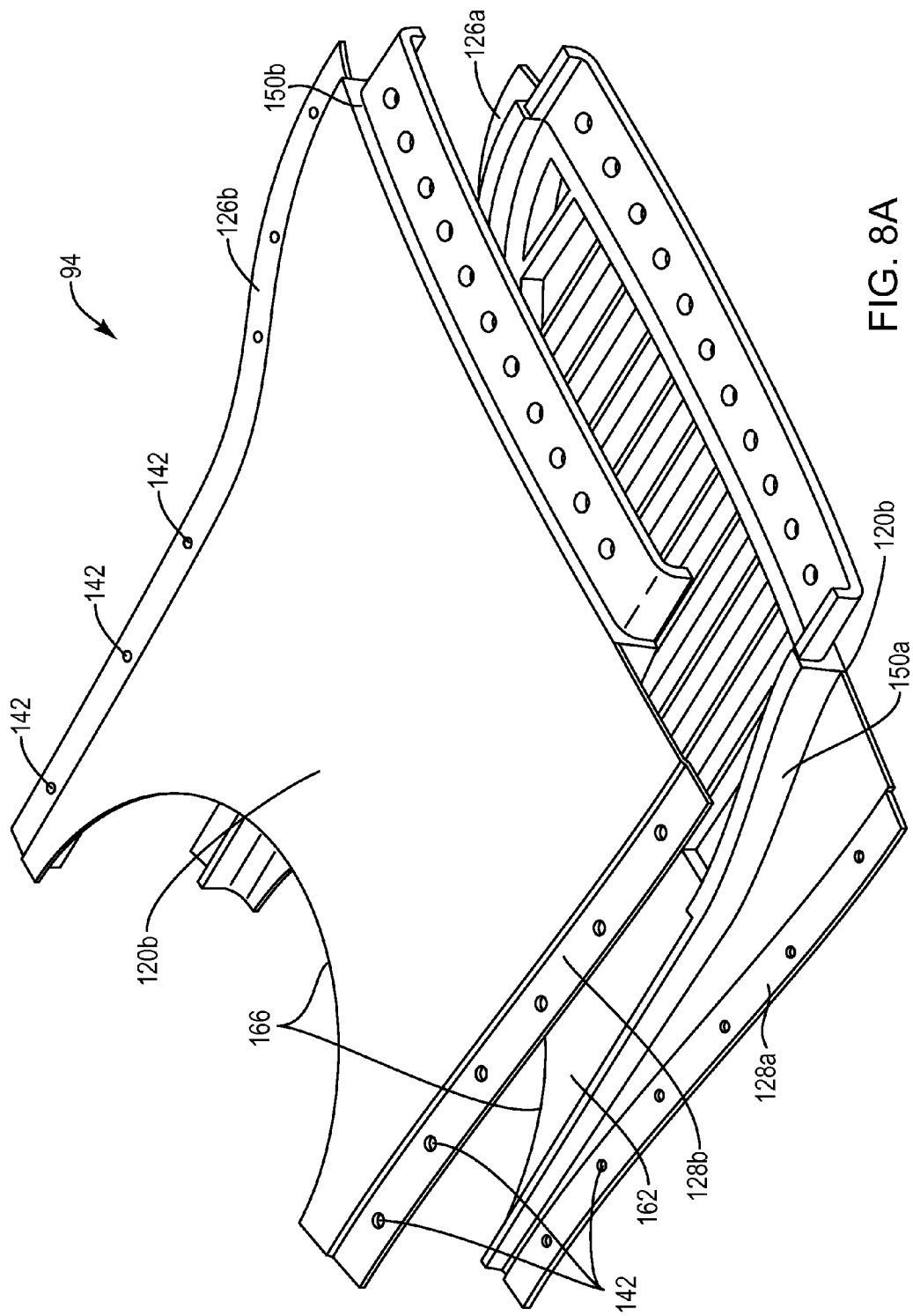

DETACHABLE ROTOR BLADE FAIRING APPARATUS AND METHOD

RELATED APPLICATIONS

This application claims the benefit of U.S. Provisional Patent Application Ser. No. 61/409,487 filed Nov. 2, 2010, which is hereby incorporated by reference in its entirety.

Additionally, this patent application hereby incorporates by reference U.S. Pat. No. 5,301,900 issued Apr. 12, 1994 to Groen et al., U.S. Pat. No. 1,947,901 issued Feb. 20, 1934 to J. De la Cierva, and U.S. Pat. No. 2,352,342 issued Jun. 27, 1944 to H. F. Pitcairn.

BACKGROUND

1. The Field of the Invention

This invention relates to rotating wing aircraft, and, more particularly to rotating wing aircraft relying on autorotation of a rotor to provide lift.

2. The Background Art

Rotating wing aircraft rely on a rotating wing to provide lift. In contrast, fixed wing aircraft rely on air flow over a fixed wing to provide lift. Fixed wing aircraft must therefore achieve a minimum ground velocity on takeoff before the lift on the wing is sufficient to overcome the weight of the plane. Fixed wing aircraft therefore generally require a long runway along which to accelerate to achieve this minimum velocity and takeoff.

In contrast, rotating wing aircraft can take off and land vertically or along short runways, inasmuch as powered rotation of the rotating wing provides the needed lift. This makes rotating wing aircraft particularly useful for landing in urban locations or undeveloped areas without a proper runway.

The most common rotating wing aircraft in use today are helicopters. A helicopter typically includes a airframe, housing an engine and passenger compartment, and a rotor, driven by the engine, to provide lift. Forced rotation of the rotor causes a reactive torque on the airframe. Accordingly, conventional helicopters require either two counter rotating rotors or a tail rotor in order to counteract this reactive torque.

Another type of rotating wing aircraft is the autogyro. An autogyro aircraft derives lift from an unpowered, freely rotating rotor or plurality of rotary blades. The energy to rotate the rotor results from a windmill-like effect of air passing through the underside of the rotor. The forward movement of the aircraft comes in response to a thrusting engine such as a motor driven propeller mounted fore or aft.

During the developing years of aviation aircraft, autogyro aircraft were proposed to avoid the problem of aircraft stalling in flight and to reduce the need for runways. The relative airspeed of the rotating wing is independent of the forward airspeed of the autogyro, allowing slow ground speed for takeoff and landing, and safety in slow-speed flight. Engines may be tractor-mounted on the front of an autogyro or pusher-mounted on the rear of the autogyro.

Airflow passing the rotary wing, alternately called rotor blades, which are tilted upward toward the front of the autogyro, act somewhat like a windmill to provide the driving force to rotate the wing, i.e. autorotation of the rotor. The Bernoulli effect of the airflow moving over the rotor surface creates lift.

Various autogyro devices in the past have provided some means to begin rotation of the rotor prior to takeoff, thus further minimizing the takeoff distance down a runway. One type of autogyro is the "gyrodyne," which includes a gyrodyne built by Fairey aviation in 1962 and the XV-1 converti- plane first flight tested in 1954. The gyrodyne includes a thrust source providing thrust in a flight direction and a large rotor for providing autorotating lift at cruising speeds. To provide initial rotation of the rotor, jet engines were secured to the tip of each blade of the rotor and powered during takeoff, landing, and hovering.

Although rotating wing aircraft provide the significant advantage of vertical takeoff and landing (VTOL), they are much more limited in their maximum flight speed than are fixed wing aircraft. The primary reason that prior rotating wing aircraft are unable to achieve high flight speed is a phenomenon known as "retreating blade stall." As the airframe of the rotating wing aircraft moves in a flight direction, rotation of the rotor causes each blade thereof to be either "advancing" or "retreating."

That is, in a fixed-wing aircraft, all wings move forward in fixed relation with the airframe. In a rotary-wing aircraft, the airframe moves forward with respect to the air. However, rotor blades on both sides move with respect to the airframe. Thus, the velocity of any point on any blade is the velocity of that point, with respect to the airframe, plus the velocity of the airframe. A blade is advancing if it is moving in the same direction as the flight direction. A blade is retreating if it is moving opposite the flight direction.

The rotor blades are airfoils that provide lift that depends on the speed of air flow thereover. The advancing blade therefore experiences much greater lift than the retreating blade. One technical solutions to this problem is that the blades of the rotors are allowed to "flap." That is, the advancing blade is allowed to fly or flap upward in response to the increased air speed thereover such that its blade angle of attack is reduced. This reduces the lift exerted on the blade. The retreating blade experiences less air speed and tends to fly or flap downward such that its blade angle of attack is increased, which increases the lift exerted on the blade.

Flap enables rotating wing aircraft to travel in a direction perpendicular to the axis of rotation of the rotor. However, lift equalization due to flapping is limited by a phenomenon known as "retreating blade stall." As noted above, flapping of the rotor blades increases the angle of attack of the retreating blade. However, at certain higher speeds, the increase in the blade angle of attack required to equalize lift on the advancing and retreating blades results in loss of lift (stalling) of the retreating blade.

A second limit on the speed of rotating wing aircraft is the drag at the tips of the rotor. The tip of the advancing blade is moving at a speed equal to the speed of the aircraft, relative to the air, plus the speed of the tip of the blade with respect to the aircraft. That is equal to the sum of the flight speed of the rotating wing aircraft plus the product of the length of the blade and the angular velocity of the rotor. In helicopters, the rotor is forced to rotate in order to provide both upward lift and thrust in the direction of flight. Increasing the speed of a helicopter therefore increases the air speed at the rotor or blade tip, both because of the increased flight speed and the increased angular velocity of the rotors required to provide supporting thrust.

The air speed over the tip of the advancing blade can therefore exceed the speed of sound even though the flight speed is actually much less. As the air speed over the tip approaches the speed of sound, the drag on the blade becomes greater than the engine can overcome. In autogyro aircraft, the tips of the advancing blades are also subject to this increased drag, even for flight speeds much lower than the speed of sound. The tip speed for an autogyro is typically smaller than that of a helicopter, for a given airspeed, since the rotor is not driven. Nevertheless, the same drag increase occurs eventually.

A third limit on the speed of rotating wing aircraft is reverse air flow over the retreating blade. As noted above, the retreating blade is traveling opposite the flight direction with respect to the airframe. At certain high speeds, portions of the retreating blade are moving rearward, with respect to the airframe, slower than the flight speed of the airframe. Accordingly, the direction of air flow over these portions of the retreating blade is reversed from that typically designed to generate positive lift. Air flow may instead generate a negative lift, or downward force, on the retreating blade. For example, if the blade angle of attack is upward with respect to wind velocity, but wind is moving over the wing in a reverse direction, the blade may experience negative lift.

The ratio of the maximum air speed of a rotating wing aircraft to the maximum air speed of the tips of the rotor blades is known as the "advance ratio. The maximum advance ratio of rotary wing aircraft available today is less than 0.5, which generally limits the top flight speed of rotary wing aircraft to less than 200 miles per hour (mph). For most helicopters, that maximum achievable advance ratio is between about 0.3 and 0.4.

In view of the foregoing, it would be an advancement in the art to provide a rotating wing aircraft capable of vertical takeoff and landing and flight speeds in excess of 200 mph.

BRIEF SUMMARY OF THE INVENTION

The invention has been developed in response to the present state of the art and, in particular, in response to the problems and needs in the art that have not yet been fully solved by currently available apparatus and methods. The features and advantages of the invention will become more fully apparent from the following description and appended claims, or may be learned by practice of the invention as set forth hereinafter.

In one aspect of the invention, a rotorcraft rotor includes a hub configured to rotationally mount to a mast of a rotorcraft. A plurality of spars are rotatably mounted to the hub. A plurality of leading edge fairings are each mounted to a blade such that the leading edge fairing extends along a major portion of the blade spar. Multiple trailing edge fairings are each mounted to a blade spar such that the leading edge fairing extends along a major portion of the blade spar and is located opposite the leading edge fairing secured to the blade spar. The blade spar, leading edge fairing, and trailing edge fairing form an airfoil contour along the length of the leading edge fairing. At least one line extends between the leading edge fairing and the blade spar or between the trailing edge fairing and the blade spar.

One or more detachable fairings may be selectively securable to the blade spar such that the detachable fairing is flush with one of the leading and trailing edge fairings. The detachable fairing and blade spar form part of an airfoil contour. The detachable fairing may extend between a distal end of at least one of the leading and trailing edge fairings and the distal end of the blade. Alternatively or in addition, a detachable fairing may extend from a proximal edge of at least one of the leading and trailing edge fairings toward the proximal end of the blade spar.

In another aspect of the invention, a tip jet attachment fitting secures at the distal end of the blade spar and is adapted to mount a tip jet to the blade spar. One or more of the detachable fairings may be selectively securable to the tip jet attachment fitting. The one or more detachable fairings and the tip jet attachment fitting form an airfoil contour.

In another aspect of the invention, the leading and trailing edge fairings include a tapered portion at a proximal or distal end thereof. The one or more detachable fairings also include a tapered portion shaped to mate with the tapered portion of at least one of the leading and trailing edge fairings.

In another aspect of the invention, a mounting structure is secured to the blade spar and the detachable fairings secure to the blade spar by means of the mounting structure. The mounting structure includes an upper plate and a lower plate secured to the blade spar opposite one another. The one or more detachable fairings secure to both the upper plate and lower plate such that the one or more detachable fairings and the upper and lower plates form an airfoil contour or part of an airfoil contour.

In another aspect of the invention, a hub shroud is positioned around the hub. The hub shroud includes a spherical surface having a spar aperture formed therein. The blade spar extends through the spar aperture and the mounting structure includes a spherical seat interfacing with the spherical surface. The proximal ends of the one or more detachable fairings engage a perimeter of the spherical seat. The spherical seat and spherical surface may each define at least one line aperture and the at least one line may extend through the line apertures.

In another aspect of the invention, at least one actuator is secured to at least one of the upper and lower plates. At least one control cable is coupled to the actuator and extends between one of the leading and trailing edge fairings and the blade spar. In some embodiments, the control cable is intersected by a neutral bending plane of the combined blade spar and leading and trailing edge fairings.

In another aspect of the invention, the blade spar includes an upper registration surface and a lower registration surface. The upper and lower plates each include a mating surface engaging the upper registration surface lower registration surfaces, respectively. The upper and lower registration surfaces include surfaces extending radially outward from a center of the blade spar and having an extent both parallel and perpendicular to a longitudinal axis of the blade spar.

A corresponding method for using a detachable fairing is also disclosed.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 7A is a front elevation cross-sectional view of a tip jet attachment fitting secured to a distal portion of a blade spar in accordance with the present invention;

FIG. 7B is a side elevation cross-sectional view of a tip jet attachment fitting secured to a distal portion of a blade spar in accordance with the present invention;

FIG. 8A is an isometric exploded view of a tip jet attachment fitting having upper and lower portions in accordance with the present invention;

DETAILED DESCRIPTION OF THE PREFERRED EMBODIMENTS

Figure 1:
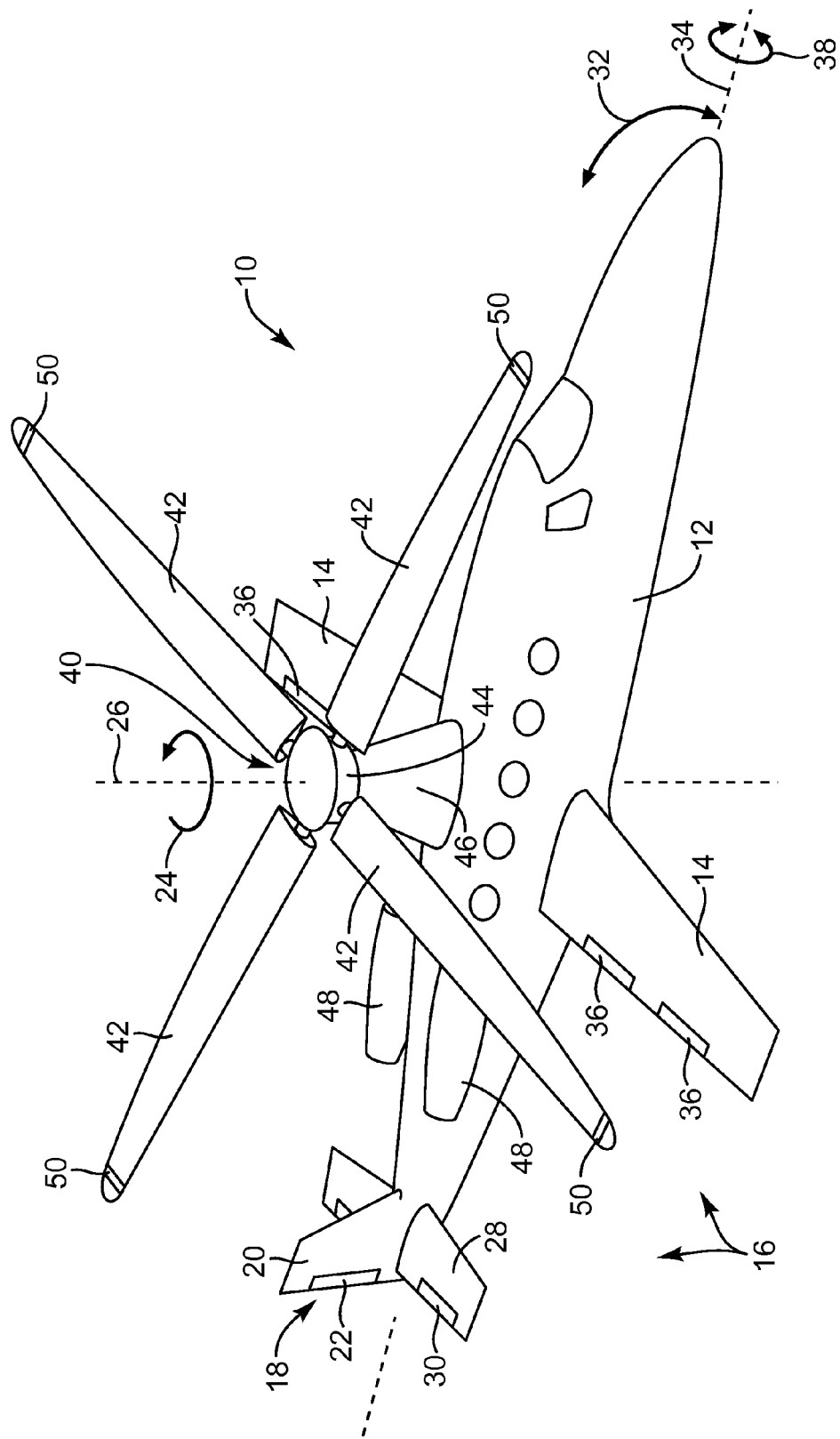
FIG. 1 is a perspective view of a rotorcraft in accordance with one embodiment of the present invention, the rotorcraft having two engines and one rotor.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIG. 1, an aircraft 10 includes an airframe 12 defining a cabin for carrying an operator, passengers, cargo, or the like. The airframe 12 may include one or more fixed wings 14 shaped as airfoils for providing lift to the aircraft. The wings 14 may be configured such that they provide sufficient lift to overcome the weight of the aircraft 10 only at comparatively high speeds inasmuch as the aircraft 10 is capable of vertical takeoff and landing (VTOL) and does not need lift from the fixed wings 14 at low speeds, e.g. below 50 mph or even 100 mph upon taking off.

In this manner, the wings 14 may be made smaller than those of fixed wing aircraft requiring a high velocity takeoff, which results in lower drag at higher velocities. In some embodiments the wings 14 provide sufficient lift to support at least 50 percent, preferably 90 percent, of the weight of the aircraft 10 at air speeds above 200 mph.

Control surfaces 16 may secure to one or both of the airframe 12 and wings 14. For example a tail structure 18 may include one or more vertical stabilizers 20 and one or more rudders 22. The rudders 22 may be adjustable as known in the art to control the yaw 24 of the aircraft 10 during flight. As known in the art, yaw 24 is defined as rotation about a vertical axis 26 of the aircraft 10. In the illustrated embodiment, the rudders 22 may comprise hinged portions of the vertical stabilizers 20.

The tail structure 18 may further include a horizontal stabilizer 28 and an elevator 30. The elevator 30 may be adjustable as known in the art to alter the pitch 32 of the aircraft 10. As known in the art, pitch 32 is defined as rotation in a plane containing the vertical axis 26 and a longitudinal axis 34 of the airframe of an aircraft 10. In the illustrated embodiment, the elevator 30 is a hinged portion of the horizontal stabilizer 28. In some embodiments, twin rudders 22 may be positioned at an angle relative to the vertical axis 26 and serve both to adjust the yaw 24 and pitch 32 of the aircraft 10.

The control surfaces 16 may also include ailerons 36 on the wings 14. As known in the art, ailerons 36 are used to control roll 38 of the airplane. As known in the art, roll 38 is defined as rotation about the longitudinal axis 34 of the aircraft 10.

Lift during vertical takeoff and landing and for augmenting lift of the wings 14 during flight is provided by a rotor 40 comprising a number of individual blades 42. The blades are mounted to a rotor hub 44. The hub 44 is coupled to a mast 46 which couples the rotor hub 44 to the airframe 12. The rotor 40 may be selectively powered by one or more engines 48 housed in the airframe 12, or adjacent nacelles, and coupled to the rotor 40. In some embodiments, jets 50 located at or near the tips of the blades 42 power the rotor 40 during takeoff, landing, hovering, or when the flight speed of the aircraft is insufficient to provide sufficient autorotation to develop needed lift.

Figure 2:
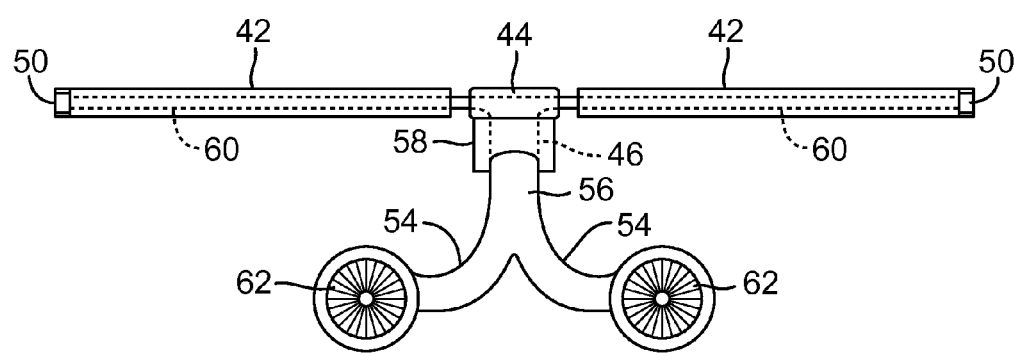
FIG. 2 is a schematic front elevation view of a compressed or otherwise pressurized air supply for tip jets in accordance with one embodiment of the present invention.

Referring to FIG. 2, while still referring to FIG. 1, in the illustrated embodiment, the engines 48 may be embodied as jet engines 48 that provide thrust during flight of the aircraft. The jet engines 48 may additionally supply compressed air to the jets 46 by driving a bypass turbine 62 or auxiliary compressor. Air compressed by the bypass turbine 62 may be transmitted through ducts 54 to a plenum 56 in fluid communication with the ducts 54.

The plenum 56 is in fluid communication with the mast 46 that is hollow or has another passage to provide for air conduction. A mast fairing 58 positioned around the mast 46 may provide one or both of an air channel and a low drag profile for the mast 46. The mast 46 or mast fairing 58 is in fluid communication with the rotor hub 44. The rotor hub 44 is in fluid communication with blade ducts 60 extending longitudinally through the blades 42 to feed the tip jets 50.

Figure 3A:
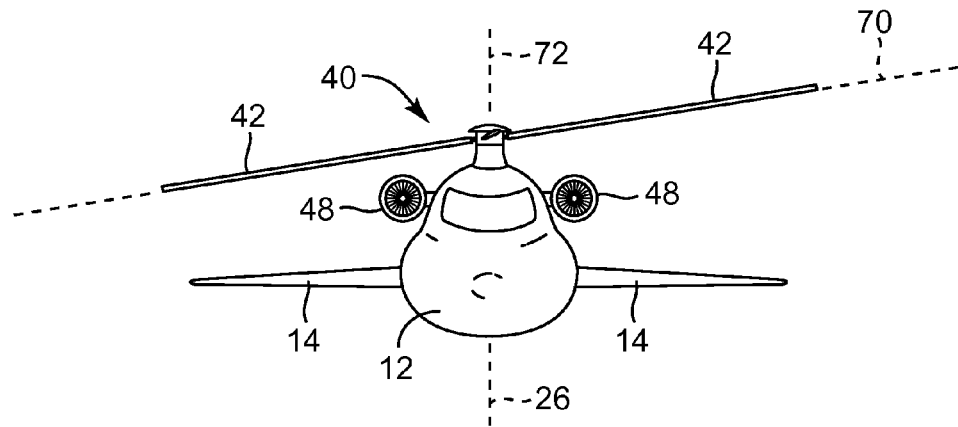
FIG. 3A is a front elevation view of a rotorcraft illustrating operational parameters describing a rotor configuration suitable for use in accordance with the present invention and the system of FIGS. 1 and 2 in particular.
Figure 3B:
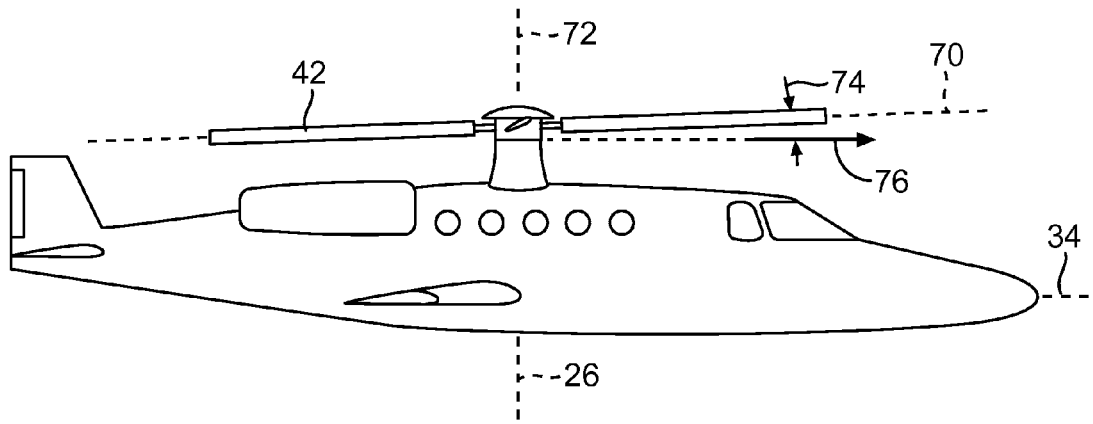
FIG. 3B is a right side elevation view of the rotorcraft of FIG. 3A.
Figure 3C:
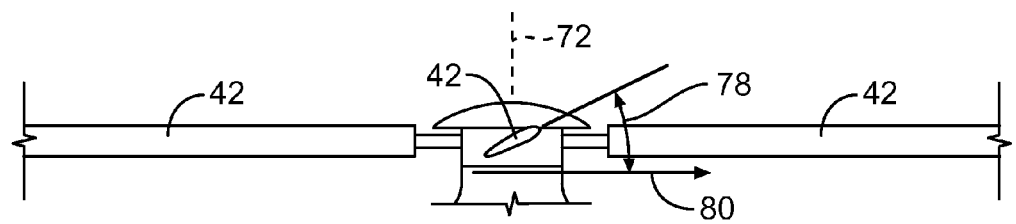
FIG. 3C is a partial cut of a right side elevation view of the rotor of FIG. 3A.

Referring to FIGS. 3A-3C, rotation of the rotor 40 about its axis of rotation 72 occurs in a rotor disc 70 that is generally planar but may be contoured due to flexing of the blades 42 during flight. In general, the rotor disc 70 may be defined as a plane in which the tips of the blades 42 travel. Inasmuch as the blades 42 flap cyclically upward and downward due to changes in lift while advancing and retreating, the rotor disc 70 is angled with respect to the axis of rotation 72 when viewed along the longitudinal axis 34, as shown in FIG. 3A.

Referring to FIG. 3B, the angle 74 of the rotor disc 70, relative to a flight direction 76 in the plane containing the longitudinal axis 34 and vertical axis 26, is defined as the angle of attack 74 or rotor disk angle of attack 74. For purposes of this application, flight direction 76 and air speed refer to the direction and speed, respectively, of the airframe 12 of the aircraft 10 relative to surrounding air. In autogyro systems, the angle of attack 74 of the rotor disc 70 is generally positive in order to achieve autorotation of the rotor 40, which in turn generates lift.

Referring to FIG. 3C, the surfaces of the blades 42, and particularly the chord of each blade 42, define a pitch angle 78, or blade angle of attack 78, relative to the direction of movement 80 of the blades 42. In general, a higher pitch angle 78 will result in more lift and higher drag on the blade up to the point where stalling occurs, at which point lift has declined below a value necessary to sustain flight. The pitch angle 78 of the blade 42 may be controlled by both cyclic and collective pitch control as known in the art of rotary wing aircraft design.

Figure 4:
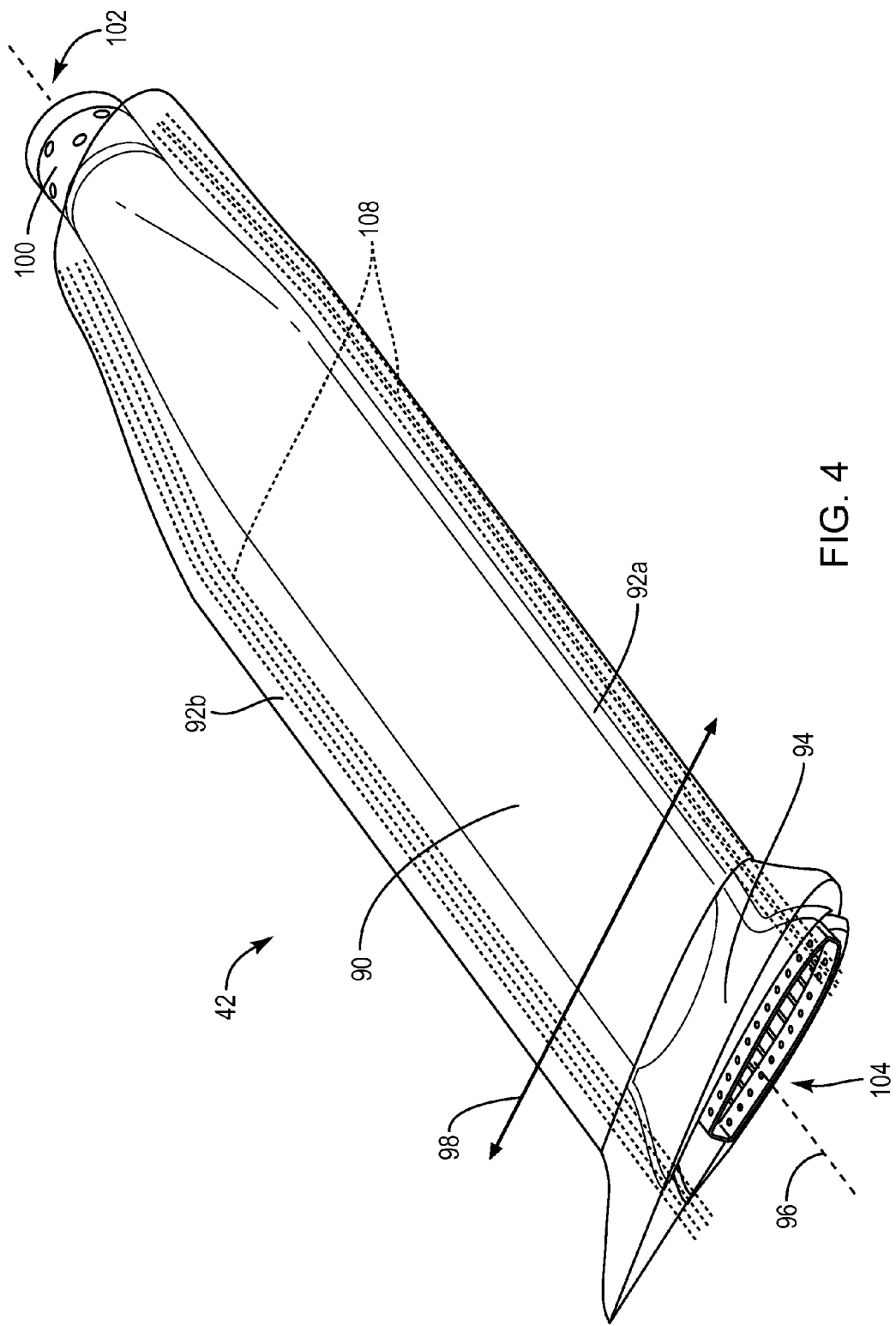
FIG. 4 is an isometric view of a rotor blade in accordance with the present invention.

Referring to FIG. 4, a blade 42 may include a spar 90, a leading edge fairing 92a, a trailing edge fairing 92b, and a tip jet attachment fitting 94. The spar 90 extends along the longitudinal axis 96 of the blade and provides structural support for the blade 42. The spar 90 may be made of a composite material such as carbon fiber, or the like. The leading and trailing edge fairings 92a, 92b secure to leading and trailing edges, respectively, of the spar 90.

Exposed surfaces of the spar 90 and leading and trailing edge fairings 92a, 92b combine to form a single airfoil contour, which may vary smoothly in cross section along the longitudinal axis 96. Stated differently, exposed surfaces of the spar 90 and leading and trailing edge fairings 92a, 92b form an airfoil contour that is common to all of the exposed surfaces. The common airfoil contour defines a transverse direction 98. The transverse direction 98 may be parallel to the chord of the common airfoil contour, where the chord is the parameter characterizing the width of an airfoil cross section, from leading to trailing edge, as known in the art of airfoil design.

For purposes of this disclosure, a single airfoil contour or a common airfoil contour is one for which a longitudinal axis exists along which each cross section of the contour perpendicular to the longitudinal axis has an airfoil shape and in which the cross section varies smoothly along the longitudinal axis. For purposes of this disclosure the cross section varies smoothly along the longitudinal axis if all curves in the outer envelope, projected onto or within a plane parallel to the longitudinal axis, have a radius of curvature greater than 10% of the length of the chord of the airfoil. Of course, corners of components located at a joint between components joined to form the airfoil contour would not be so situated.

One or both of the blade 42 and fitting 94 may be formed of a composite material. In particular, reinforced composite materials including carbon fiber fixed in a polymeric matrix are suitable. Inasmuch as the compressed air passing through the blade ducts and fitting 94 may have a temperature as high as 400° C., the polymeric matrix preferably withstands such temperatures for extended periods without degrading. Examples of such matrix materials include various thermosets such as epoxies and the like. Matrices of long-chain, cross linked polymers provide suitable strength.

The blade 42 additionally includes a blade root 100 located near a proximal end 102 of the blade spar 90 for attachment to the rotor hub 40. The tip jet attachment fitting 94 secures to the blade spar 90 near the distal end 104 of the blade spar 90 and serves to couple a tip jet 50 to the blade spar 90. Lines 108 coupling fuel and control signals to the tip jets 50 and carrying feedback signals to a flight control system may extend through the leading and trailing edge fairings 92a, 92b to the tip jets 50. The blade spar 90 may be hollow and serve as the blade duct 60 conducting compressed air to the tip jets 50.

Figure 5A:
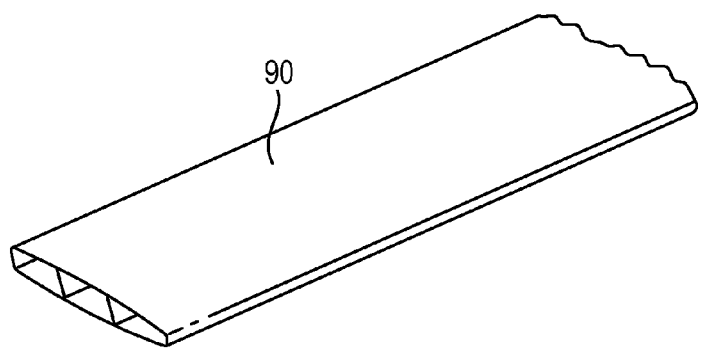
FIGS. 5A through 5C are isometric views illustrating a method of assembly of a rotor blade, tip jet attachment fitting, and leading and trailing fairings in accordance with the present invention.
Figure 5B:
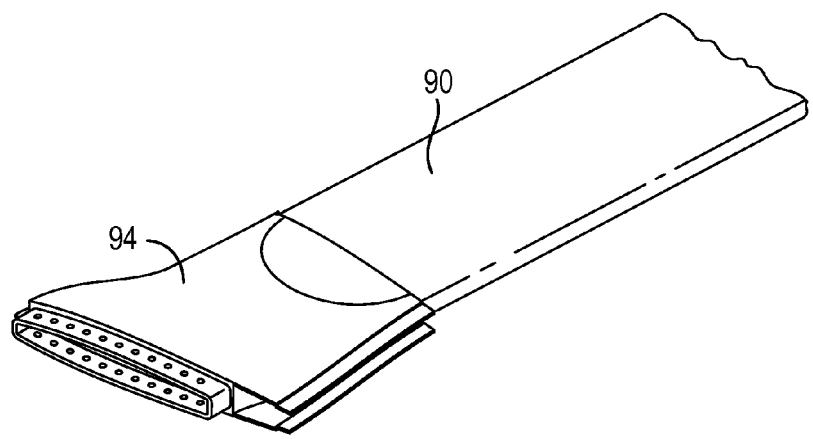
Figure 5C:
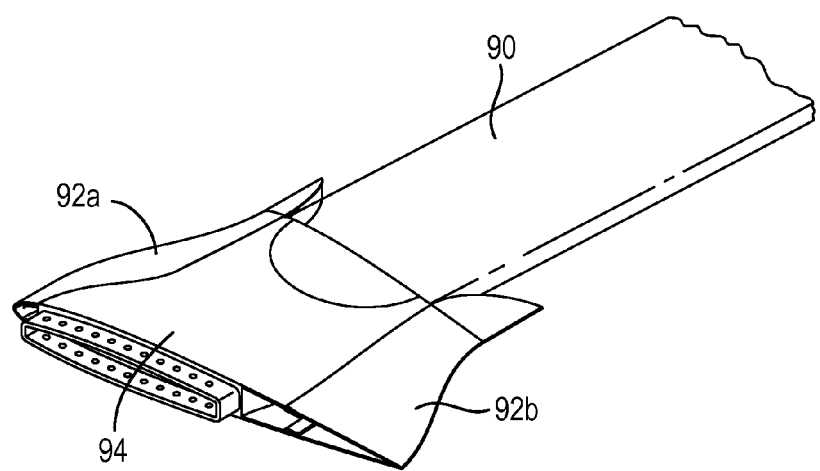

FIGS. 5A through 5C illustrate a method for manufacturing the blade 42 of FIG. 4. The blade 42 may be manufactured by first securing the fitting 94 to a distal portion of the blade spar 90, as shown in FIGS. 5A and 5B. The leading and trailing edge fairings 92a, 92b are then secured to the leading and trailing edges, respectively, of the combined fitting 94 and blade spar 90, as shown in FIG. 5C.

In some embodiments, the leading and trailing edge fairings 92a, 92b are secured to the leading and trailing edges, respectively, of the blade spar 90 prior to securement of the fitting 94 to the blade spar 94. The tip jets 50 may be attached to the fitting 94 either before or after attachment of the fitting 94 to the blade spar 90. The order of securement of the leading and trailing edge fairings 92a, 92b, fitting 94, and tip jets 94 may be arranged to facilitate placement of the lines 108 and coupling of the lines 108 to the tip jets 50.

Figure 6:
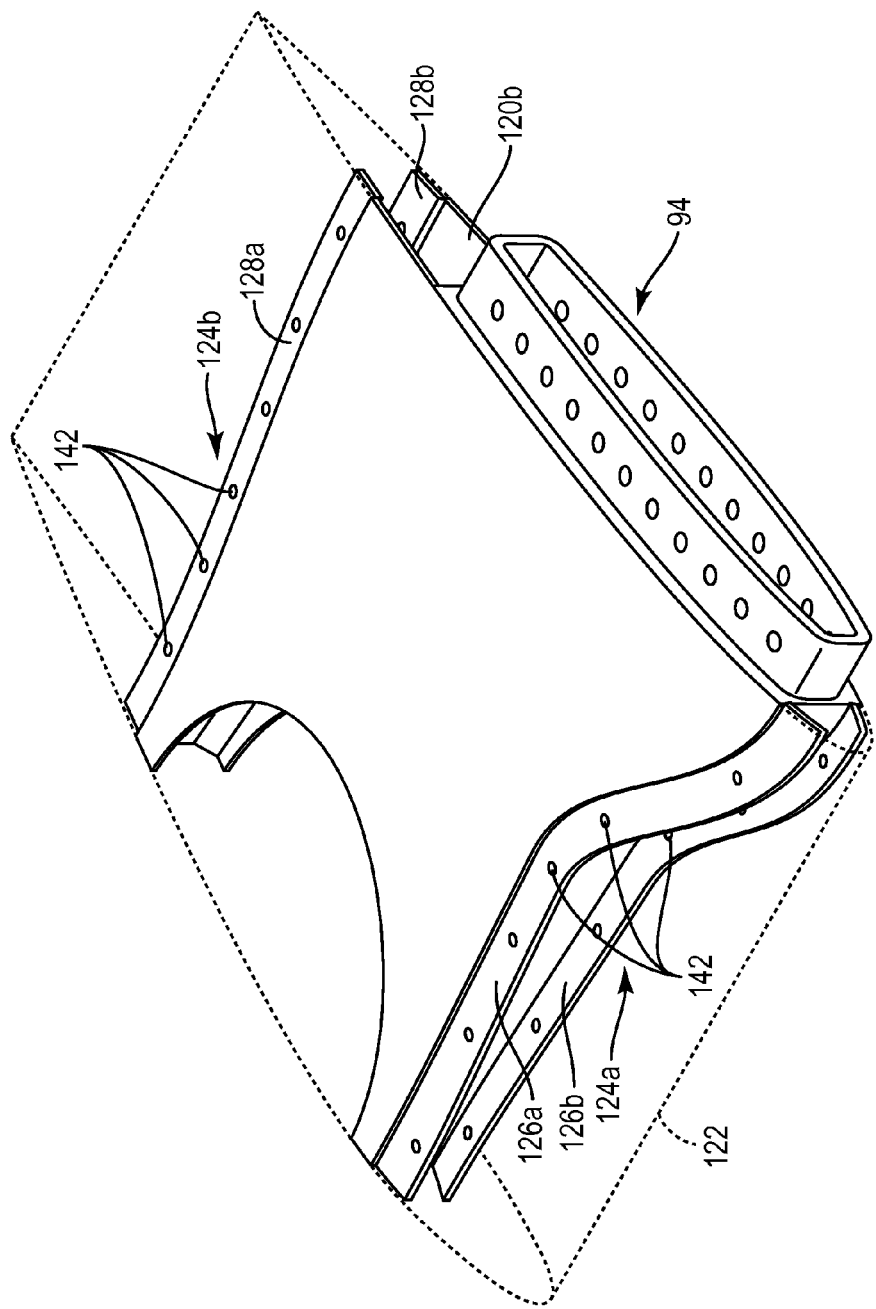
FIG. 6 is an isometric view of a tip jet attachment fitting in accordance with the present invention.

Referring to FIG. 6, while still referring to FIG. 1, the tip jet attachment fitting 94 includes an upper surface 120a and a lower surface 120b. The upper and lower surfaces 120a, 120b lie on an air foil contour 122 and form part of an air foil having the air foil contour and including the upper and lower surfaces 120a, 120b, the leading edge fairing 92a, the trailing edge fairing 92b, and portions of the spar 90 not covered by the leading and trailing edge fairings 92a, 92b.

The fitting 94 includes a leading fairing receiver 124a and a trailing fairing receiver 124b configured to secure to the leading and trailing fairings 92a, 92b, respectively. The leading and trailing fairing receivers 124a, 124b may insert within a cavity or concave surface of the fairings 92a, 92b or may define a cavity sized to receive a portion of the fairings 92a, 92b. The leading and trailing fairing receivers 124a, 124b may secure to the leading and trailing fairings 92a, 92b by means of adhesive, screws, rivets, metallic or polymeric welds, or the like.

In the illustrated embodiment, the leading fairing receiver 124a is embodied as upper and lower flanges 126a, 126b and the trailing fairing receiver 124b is embodied as upper and lower flanges 128a, 128b. In the illustrated embodiments, the flanges 126a, 126b and flanges 128a, 128b are spaced inwardly from the common airfoil contour 122 such that they do not lie on the common airfoil contour. In embodiments where the leading and trailing fairings 92a, 92b insert between the flanges 126a, 126b and flanges 128a, 128b, respectively, the flanges 126a, 126b and flanges 128a, 128b may lie on the common airfoil contour 122.

The flanges 126a, 126b and flanges 128a, 128b may be monolithically formed with the fitting 94 or secured thereto by means of adhesives, fasteners, metallic or polymeric welds. or the like. In the illustrated embodiment, the fitting 94 is formed of layers of composite material and are formed monolithically with the fitting 94. The flanges 126a, 126b and flanges 128a, 128b may be formed by any suitable metal working or polymer forming technique, such as milling out portions of the fitting 94.

Referring to FIGS. 7A and 7B, while still referring to FIG. 6, in the illustrated embodiments, outer surfaces 130 of the upper and lower flanges 126a, 126b engage a concave inner surface 132 of the leading fairing 92a. The outer surfaces 130 of the upper and lower flanges 126a, 126b are spaced inwardly from the upper and lower surfaces 120a, 120b of the fitting 94. Thus, the outer surface 134 of the leading fairing 92a is flush with the surfaces 120a, 120b. Likewise, the outer surface 134 and the surfaces 120a, 120b lie on the airfoil contour 122, which extends across the joint between the leading fairing 92a and the fitting 94.

In a like manner, outer surfaces 136 of the upper and lower flanges 128a, 128b engage a concave inner surface 138 of the trailing fairing 92b. The outer surfaces 136 of the upper and lower flanges 128a, 128b are spaced inwardly from the upper and lower surfaces 120a, 120b of the fitting 94, respectively. Thus, the outer surface 140 of the trailing fairing 92b is flush with the surfaces 120a, 120b. Likewise, the outer surface 140 and the surfaces 120a, 120b lie on the airfoil contour 122, which extends across the joint between the trailing fairing 92b and the fitting 94.

The upper and lower flanges 126a, 126b and the upper and lower flanges 128a, 128b may fasten to the leading and trailing edge fairings 92a, 92b, respectively. Fasteners may be or include one or more of rivets, screws, high strength adhesive, metallic or polymeric welds, or the like.

For example, the upper and lower flanges 126a, 126b and upper and lower flanges 128a, 128b may include a plurality of apertures 142 (see FIG. 6) for receiving rivets 144, screws 144, or other fasteners 144, securing the flanges 126a, 126b and flanges 128a, 128b to the leading and trailing edge fairings 92a, 92b, respectively. An adhesive may additionally or alternatively bond the outer surfaces 130, 136 to the surfaces 132, 140, respectively.

In the illustrated embodiment, the fitting 94 includes an upper portion 150a and a lower portion 150b secured to one another to capture a distal portion 152 of the blade spar 90 therebetween. The upper portion 150a may be secured to the lower portion 150b by fasteners, such as metallic or polymeric welds, adhesives, or the like. In some embodiments, straps encircling both the upper and lower portions 150a, 150b may secure the upper and lower portions 150a, 150b to one another. In the illustrated embodiment, bolts 154 passing through the upper and lower portions 150a, 150b and nuts 156 secured to the bolts 154 fasten the upper and lower portions 150a, 150b to one another. The bolts 154 may additionally pass through the distal portion 152 of the blade spar 90.

Referring specifically to the embodiment of FIG. 7B, the blade spar includes a blade duct 60 extending therethrough. The fitting 94 likewise defines an air channel 158 passing completely therethrough and serving to conduct compressed air from the blade duct 60 to the tip jets 50. In embodiments including a fitting 94 having upper and lower portions 150a, 150b, the air channel 158 is formed by corresponding cavities 160a, 160b formed in the upper and lower portions 150a, 150b.

Figure 8B:
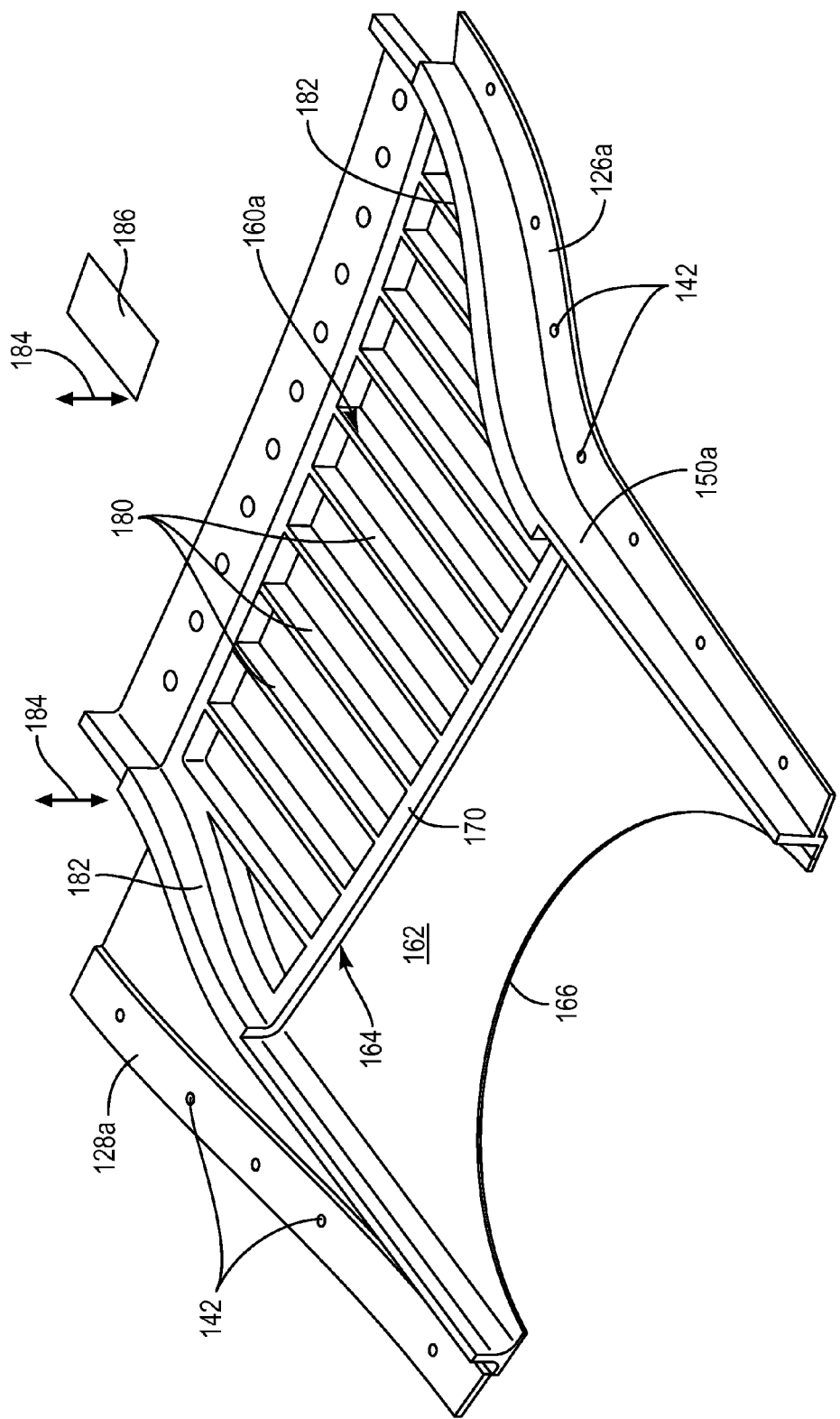
FIG. 8B is an isometric view of an upper portion of a tip jet attachment fitting having upper and lower portions in accordance with the present invention.

FIGS. 8A and 8B illustrate embodiments of upper and lower portions 150a, 150b. FIG. 8B illustrates the upper portion 150a. However, the lower portion 150b may substantially mirror the upper portion 150a. One exception is that the upper portion 150a includes the upper surface 120a forming a portion of the upper surface of the airfoil contour 122. Likewise, the lower portion 150b includes the lower surface 120b forming a portion of the lower surface of the airfoil contour 122.

The upper portion 150a includes the upper leading flanges 126a and the upper trailing flange 128a. The lower portion 150b includes the lower leading flange 126b and the lower trailing flange 128b. The upper and lower portions 150a, 150b may include one or more of a mating surface 162, a stop 164, and a registration surface 166 to facilitate securement of the fitting 94 to the distal portion 152 of the blade spar 90. The structure and function of the mating surface 162, stop 164, and registration surface 166 are better understood in relation to the distal portion 152 of the blade spar 90 illustrated in FIG. 9.

Figure 9:
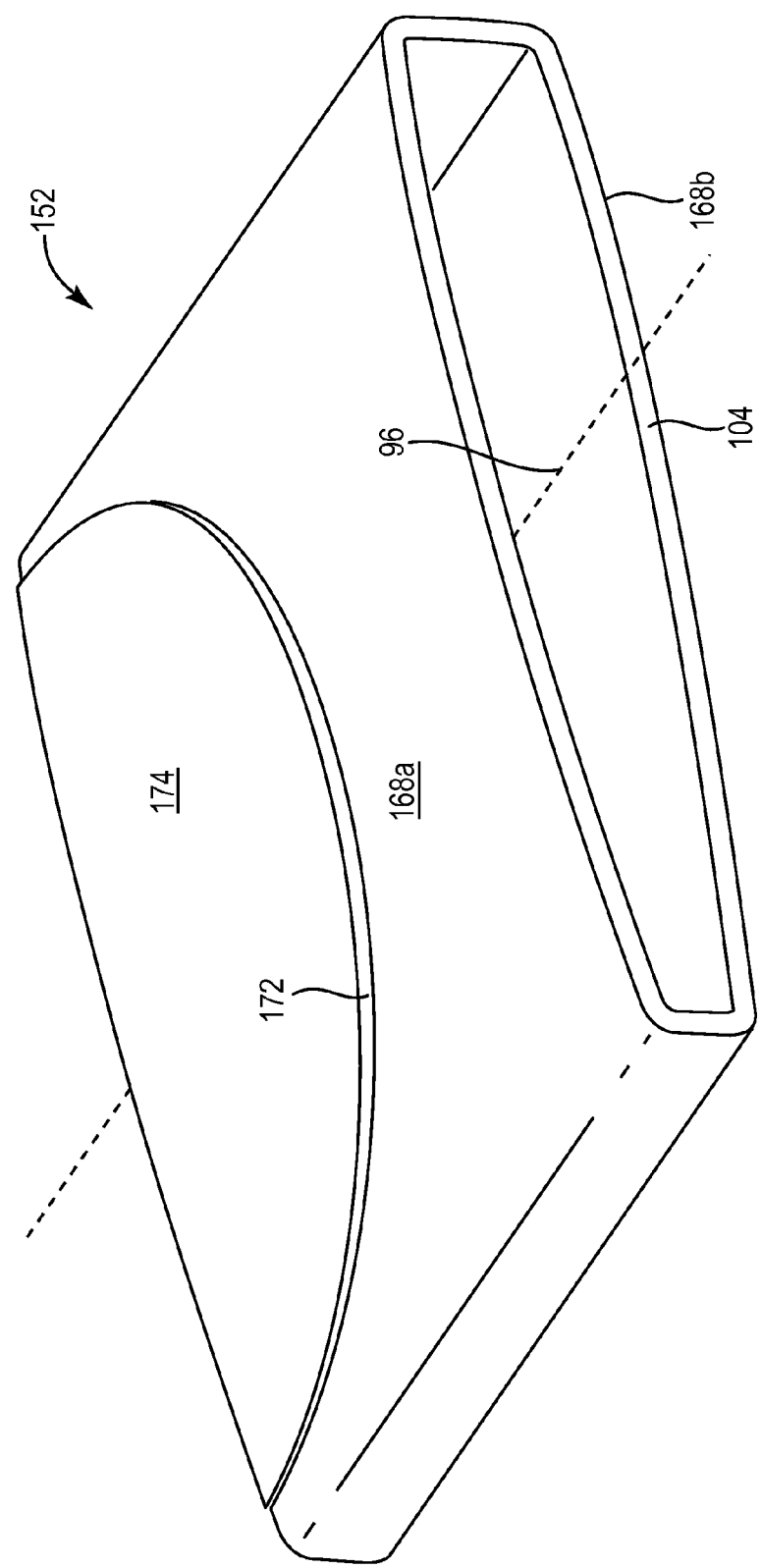
FIG. 9 is an isometric view of a distal portion of a blade spar in accordance with the present invention.

Referring to FIG. 9, while still referring to FIGS. 8A and 8B, the distal portion 152 of the blade spar 90 includes an upper mating surface 168a and a lower mating surface 168b. The mating surfaces 162 of the upper and lower portions 150a, 150b may conform to the mating surfaces 168a, 168b. They may also be positioned such that a thin layer of adhesive will be effective to secure the mating surfaces 162 to the upper and lower mating surfaces 168a, 168b. This condition may exist when the upper and lower portions 150a, 150b are secured to one another having a portion of the blade spar 90 captured therebetween as shown in FIGS. 7A and 7B.

The stop 164 may engage the distal end 104 of the blade spar 90 when the distal portion 152 is placed within the fitting 94, such as adjacent the mating surfaces 154 of the upper and lower portions. The stop 164 may be embodied as a ridge 170 extending generally in the transverse direction partially or completely across the mating surfaces 154 of the upper and lower portions 150a, 150b.

The registration surfaces 166 may have a contour conforming to the contour of one or more corresponding registration surfaces 172 secured to the distal portion 152 of the blade spar 90. The registration surface 172 may include a surface 172 extending between an outer surface 174 of the blade spar located proximally from the registration surface 172 and the mating surfaces 168a, 168b. The surface 172 may have an extent radially outward from the longitudinal axis 96 of the blade spar 90. In some embodiments, the surface 172 is formed by the edges of layers of composite material adhered to the blade spar 90.

In some embodiments, the registration surface 172 has an extent both perpendicular to the longitudinal axis 96 and parallel to the longitudinal axis 96. The blade spar 90 is subject to very large radial loads along the longitudinal axis 96 due to centrifugal forces on the tip jet 50. The spar 90 is also subject to bending loads perpendicular to the longitudinal axis due to lift on the blade 42. The registration surface 172 therefore describes a path across the blade spar 90 such that the path is not entirely located a single radial distance from the hub 44 in order to avoid stress concentrations that would degrade the load bearing capacity of the blade spar 90. In the illustrated embodiment, the registration surface 172 defines an arcuate path extending completely or partially across the blade spar 90. In the illustrated embodiment, the registration surface 172 is oriented such that it forms a convex surface facing the distal end 104 of the blade spar 90.

The registration surfaces 166 of the upper and lower portions 150a, 150b may conform to the contour of the registration surface 172 of the blade spar 90. In the illustrated embodiment, the registration surfaces 166 comprises concave, arcuate surfaces formed on the upper and lower portions 150a, 150b facing the proximal end 102 of the blade spar 90 when the fitting 94 is secured to the distal portion 152 of the blade spar 90. In use, the registration surfaces 166 of the upper and lower portions 150a, 150b and the one or more registration surfaces 172 of the blade spar 90 facilitate alignment and mounting of the fitting 94 onto the blade spar 90.

Referring specifically to FIGS. 8A and 8B, in some embodiments, ribs 180 extend along a portion of the cavities 160a, 160b of the upper and lower portions 150a, 150b in order to stiffen the fitting 94. The ribs 180 may be formed in the same step in which the upper and lower portions 150a, 150b are molded or laid-up as layers of composite material. Alternatively, the ribs 180 may be formed by milling the upper and lower portions 150a, 150b. In the illustrated embodiment, the ribs 180 extend generally parallel to the longitudinal axis 96 of the blade spar 90 when the fitting is secured thereto, however other orientations are also suitable. In the illustrated embodiments, the ribs 180 are flush with the ridge 170 forming the stop 164.

The upper and lower portions 150a, 150b may additionally form vanes 182 to direct the flow of air from the blade duct 60 of the blade spar to the tip jet 50. The vanes 182 may be oriented to narrow or widen the fluid channel between the blade duct 90 and the tip jet in order to accelerate or decelerate the speed of fluid flow, manipulate pressure recovery or to accommodate a difference in size between the blade duct 60 and an intake port of the tip jet 50. The vanes 182 may additionally or alternatively be oriented to change the direction of airflow from the blade duct 60 to the intake port of the tip jet 50 in order to accommodate misalignment between the blade duct 60 and the intake port of the tip jet 50.

In the illustrated embodiment, the vanes 182 extend in a vertical direction 184 into the cavity 160a, 160b defined by the upper and lower portions 150a, 150b and have a contour in a horizontal plane 186, to which the vertical direction 184 is orthogonal. This configuration is in order to achieve a needed change in fluid channel cross section and to redirect air flow. However, vanes 182 having a curved shape in both the horizontal plane 186 and a vertical plane parallel to the vertical direction 184 may also be used.

Figure 10:
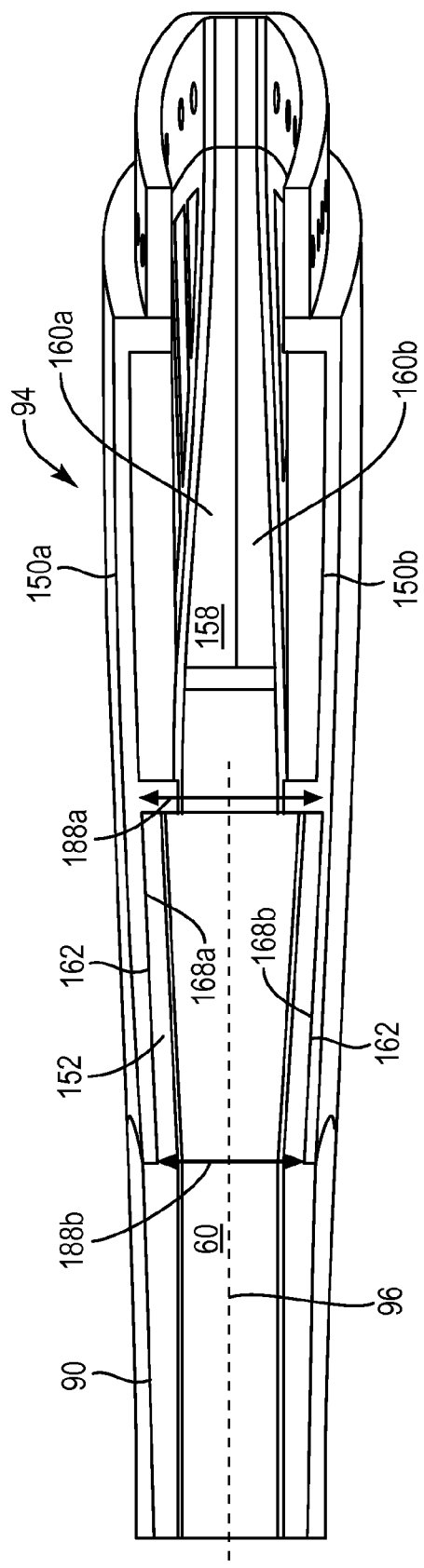
FIG. 10 is a side elevation cross-sectional view of a tip jet attachment fitting secured to a distal portion of a blade spar having a reverse taper in accordance with the present invention.

Referring to FIG. 10, in some embodiments, at least a portion of the mating surface 168a diverges from an opposite portion of the mating surface 168b with distance from the proximal end 102. The mating surfaces 162 of the upper and lower portions 150a, 150b may likewise diverge from one another with distance from the proximal end 102 of the blade spar 90 when the fitting 94 is secured to the blade spar 90.

Stated differently, the distal portion 152 has a reverse taper and the cavity defined by the mating surfaces 162 of the upper and lower portions 150a, 150b also has a reverse taper. The divergence of the mating surfaces 168a, 168b enables the mating surfaces 168a, 168b to resist removal of the fitting 94 from the blade spar 90 when subject to high centrifugal force due to high angular speeds of the rotor 40. The mating surfaces 168a, 168b may diverge along a straight or curved line or in a stepwise fashion.

The distal ends of the mating surfaces 168a, 168b are separated by a distance 188a. The proximal ends of the mating surfaces 168a, 168b are separated by a distance 188b. Here, the distances 188a, 188b are the distances between the mating surfaces 168a, 168b at the distal and proximal ends, respectively. The distance is measured in some plane intersecting the upper and lower portions 150a, 150b and parallel to, but not necessarily coextensive with, the longitudinal axis 96 of the blade spar 90 when the fitting 94 is secured to the blade spar 90. In some embodiments, the distance 188a is three percent, preferably five percent, and more preferably 10 percent, greater than the distance 188b.

Figure 11:
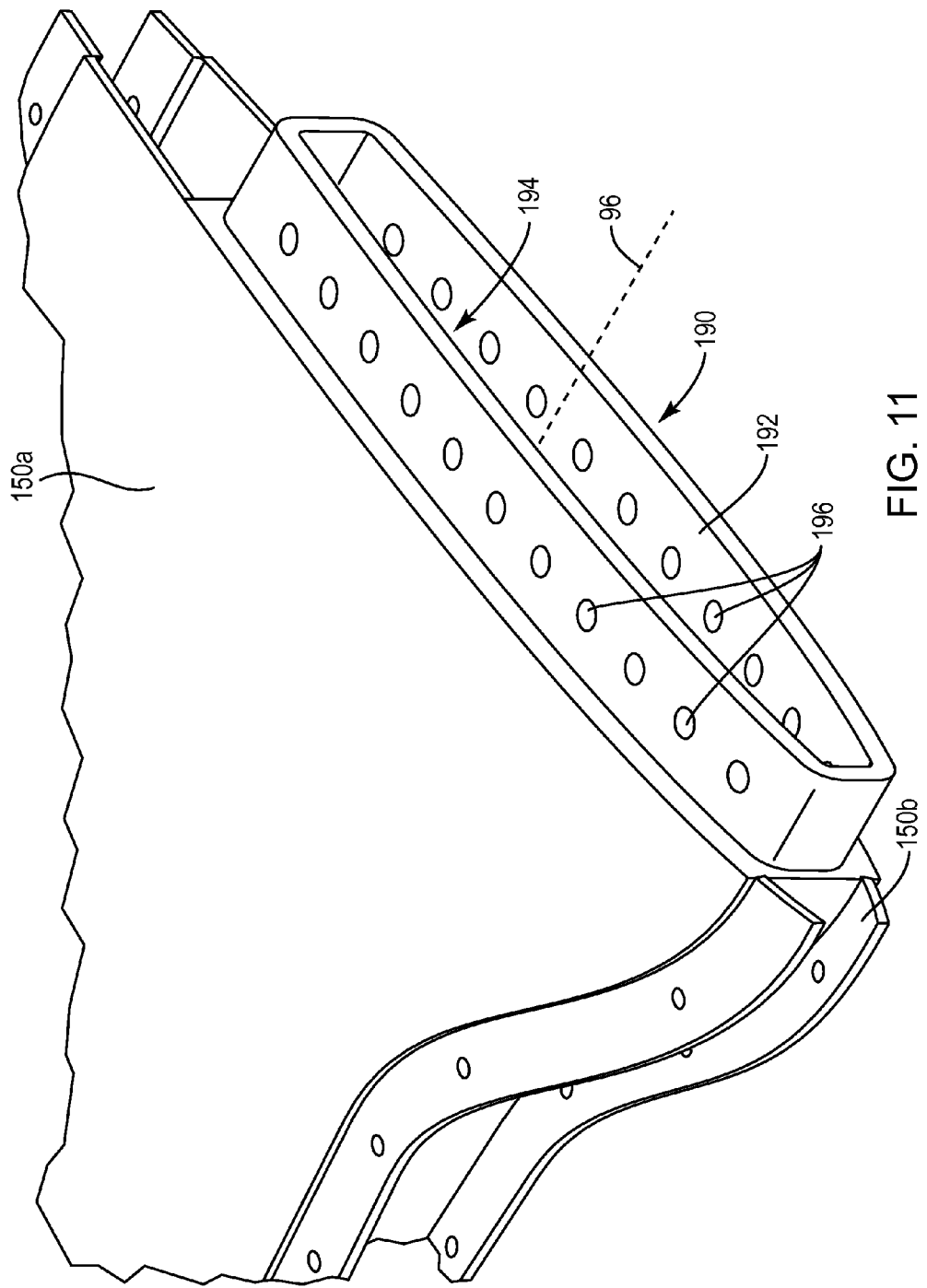
FIG. 11 is a partial isometric view of a tip jet receiver of a tip jet attachment fitting in accordance with the present invention.

Referring to FIG. 11, the fitting 94 includes a tip jet receiver 190 for securing to a tip jet 50. The tip jet receiver 190 may insert within a cavity or other structure of the tip jet 50 or may receive a portion of the tip jet 50 inserted therein. In the illustrated embodiment, the tip jet receiver 190 is a flange 192 projecting distally from the fitting 94 along the longitudinal axis 96 of the spar 90 when the fitting 94 is secured thereto. The flange 192 describes a closed path around an opening 194 in the fitting 94 in fluid communication with the blade duct 60, such as by means of the air channel 158. The flange 192 may include two portions secured to the upper and lower portions 150a, 150b, respectively.

The flange 192 may secure to the tip jet 50 by means of adhesives, mechanical fasteners, metallic or polymeric welds, or the like. In the illustrated embodiment, the flange 192 includes a plurality of apertures 196 for receiving fasteners such as rivets, screws, bolts, or the like. The flange 192 may additionally or alternatively be secured to the tip jet 50 by means of an adhesive applied to an outer or inner surface of the flange 192.

Figure 12:
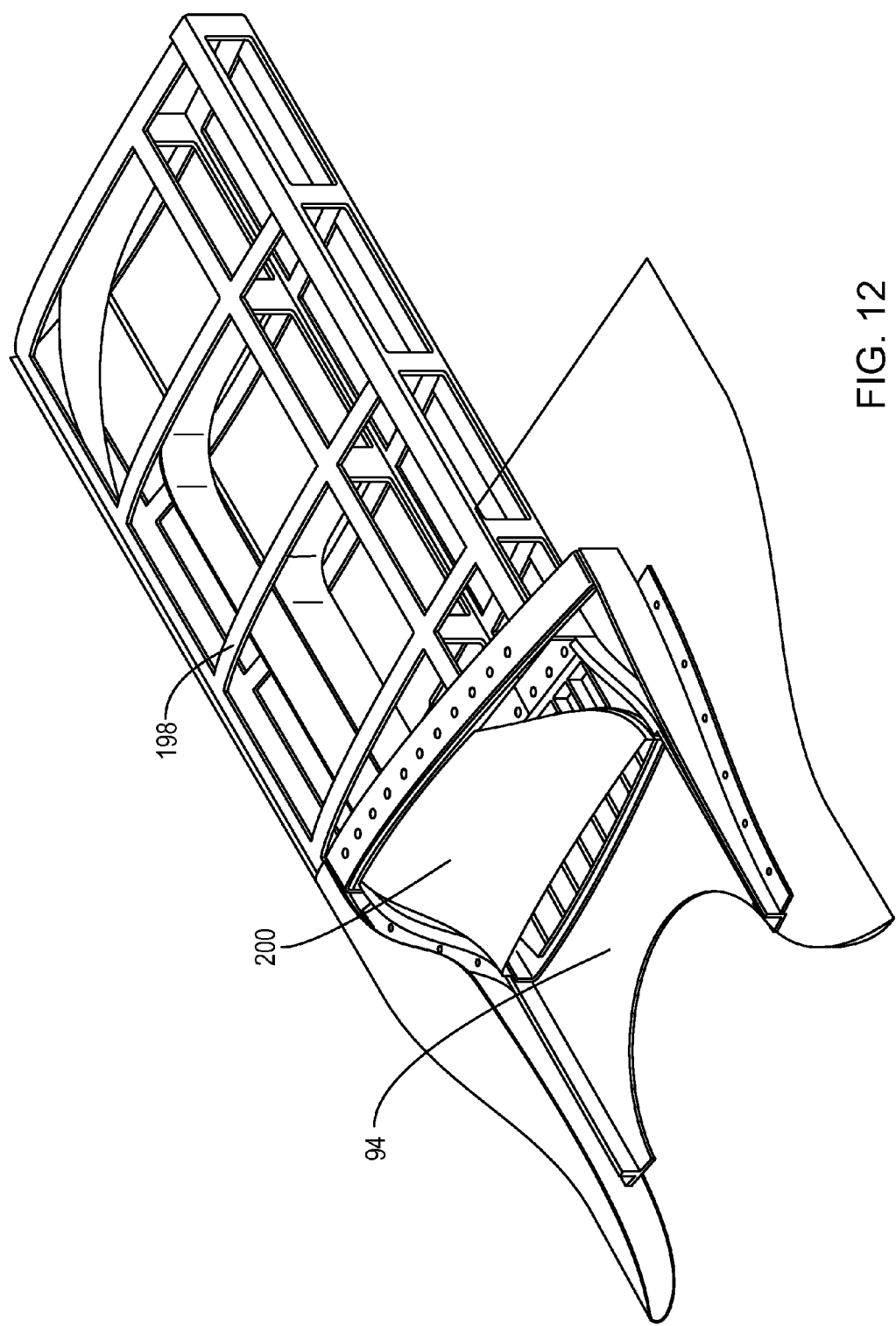
FIG. 12 is an isometric cutaway view of a tip jet attachment fitting secured to a tip jet frame in accordance with the present invention.

Referring to FIG. 12, the flange 192 may secure to the tip jet 50, such as by means of a frame 198, or like structure, of the tip jet 50. The tip jet 50 may include an insert 200 positioned within one or both of the fitting 94 and blade duct 60 in order to direct flow of the compressed air into the tip jet 50. Alternatively, the insert 200 may be secured within the fitting 94 and not attached directly to the tip jet 50. The insert 200 may be embodied as a sleeve having an inner contour effective to achieve a needed or specified output velocity and direction of air directed therethrough and into the tip jet 50 for discharge in to the environment to create thrust.

Figure 13:
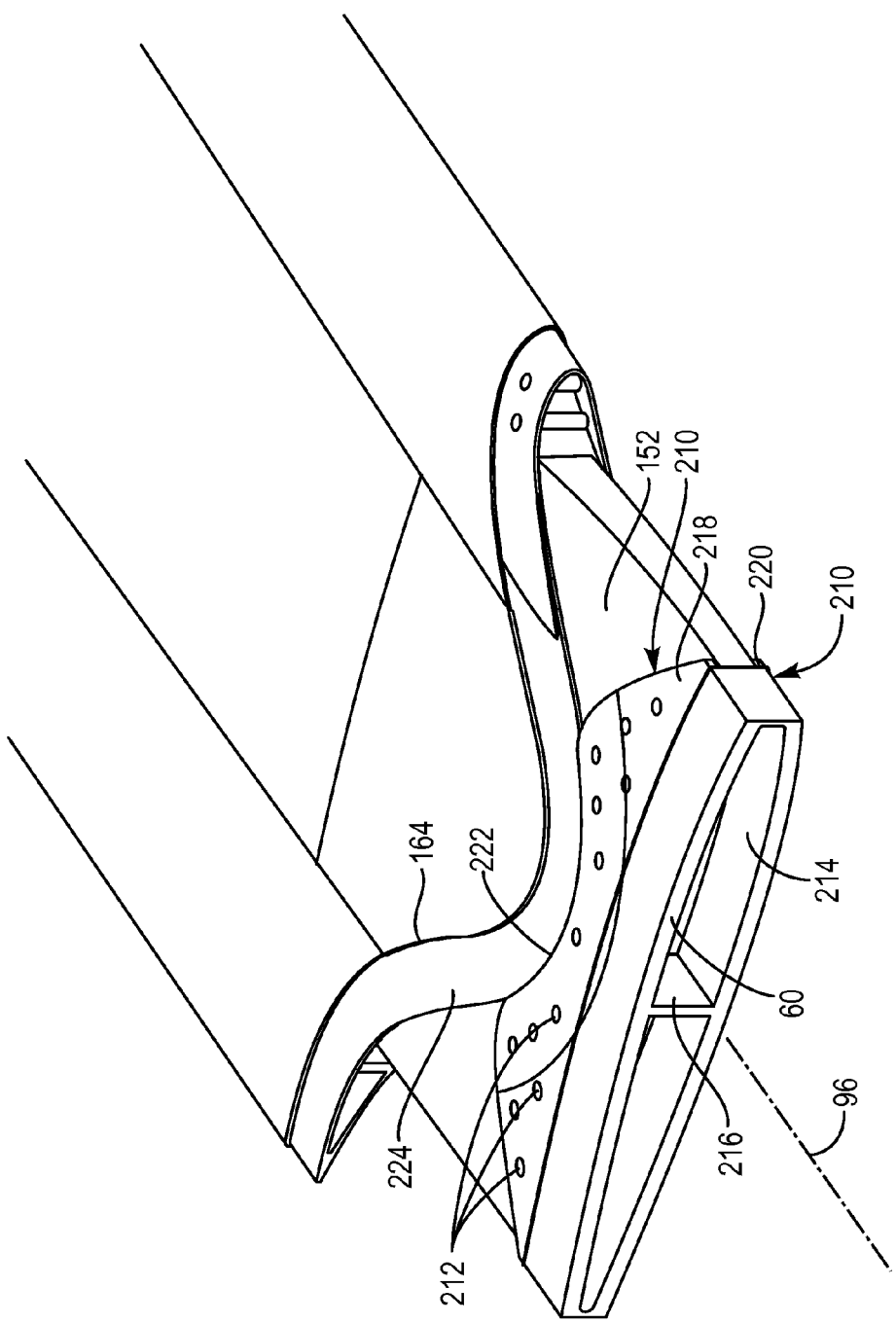
FIG. 13 is an isometric view of a distal portion of a blade spar in accordance with the present invention.

Referring to FIG. 13, various methods and apparatus may be used to secure the fitting 94 to the blade spar 90. In one embodiment, a fastener receptacle 210 secures to the distal portion 152 of the blade spar 90. The fastener receptacle 210 may be formed of metal or some other material more suitable for receiving fasteners than composite materials. Composite materials have a high strength to weight ratio and therefore may be made very thin and still have adequate structural properties. However, a thin composite layer may not be suitable for receiving fasteners. Accordingly, a fastener receptacle 210 formed of metal or other material may secure to the composite blade spar 90, such as by means of an adhesive for the purpose of receiving fasteners. The fastener receptacle 210 may include a plurality of apertures 212 for receiving fasteners. The apertures 212 may be threaded such that threaded fasteners may be used without the need for a nut or other threaded structure.

The illustrated fastener receptacle 210 includes a tube portion 214 abutting the distal end of the blade spar 90. The tube portion 214 may include a web 216 which may align with a corresponding shear web within the blade duct 60. The apertures 212 are formed in an upper plate 218 and an opposing lower plate 220 having a portion of the distal portion 152 captured therebetween. The plates 218, 220 secure to the tube portion 214. The tube portion 214 is in fluid communication with the blade duct 60 and permits the flow of air from the blade duct 60 to the tip jet 50.

The plates 218, 220 may include a registration surface 222 engaging a corresponding registration surface 224 formed on the blade spar 90. In the illustrated embodiment, the registration surface 224 is surface extending radially outward from the longitudinal axis 96 of the blade spar 90. The registration surface 224 preferably has an extent both parallel to the longitudinal axis 96 and perpendicular to the longitudinal axis 96 in order to avoid an abrupt change in cross section extending across the entire blade spar 90 at one radial position relative to the axis of rotation of the blade spar 90. The registration surface 222 may have a corresponding shape and orientation to mate with the registration surface 224. The registration surface 224 may be the same or a different surface as the registration surface 164 engaging the tip jet attachment fitting 94.

Figure 14:
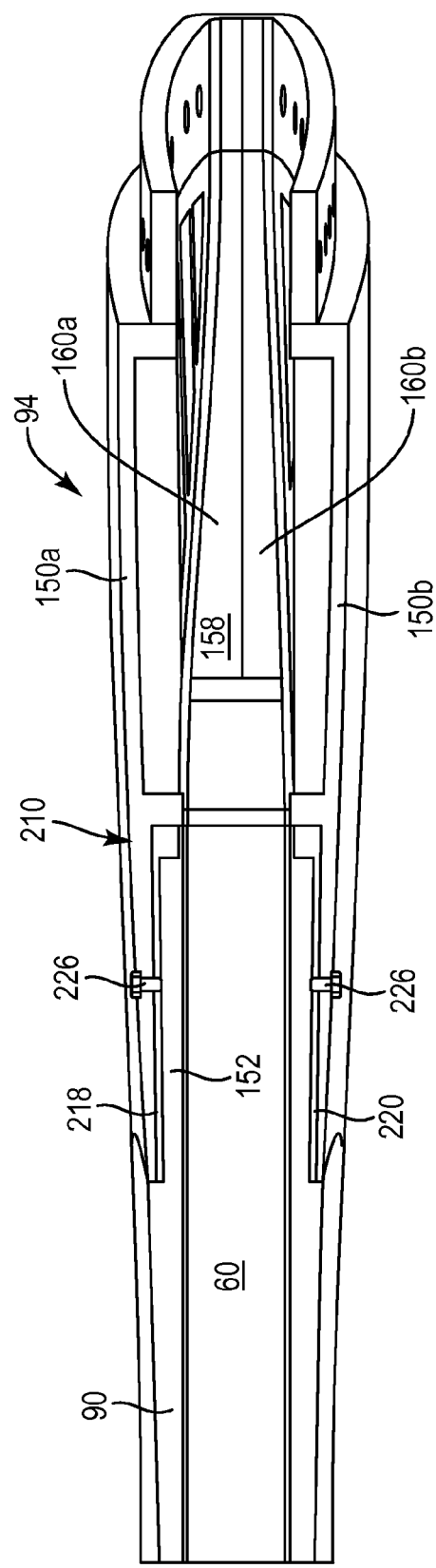
FIG. 14 is a side elevation cross sectional view of a distal portion of a blade spar having the tip jet attachment fitting secured thereto in accordance with the present invention.

Referring to FIG. 14, as in other embodiments described herein, the distal portion 152 having the fastener receptacle 210 secured thereto as illustrated in FIG. 13 is positioned within the tip jet attachment fitting 94. The apertures 212 of the fastener receptacle 210 may receive fasteners 226 passing through apertures 228 defined in the tip jet attachment fitting 94 in order to secure the fitting 94 to the blade spar 90.

Figure 15:
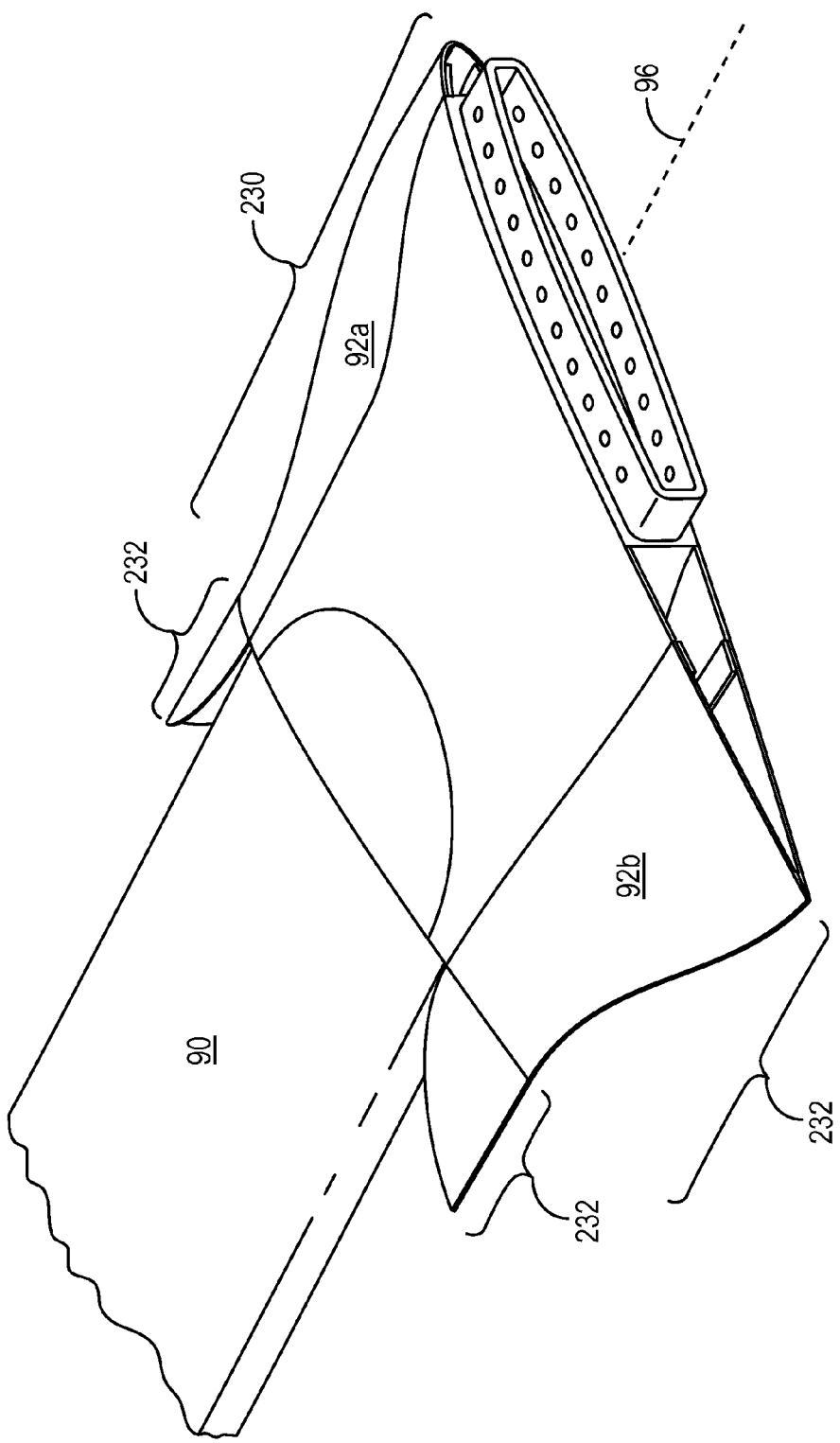
FIG. 15 is an isometric view of a distal portion of a blade spar and tip jet attachment fitting having detachable leading and trailing edge fairings in accordance with the present invention.

Referring to FIG. 15, in some embodiments, one or both of the leading edge fairing 92a and the trailing edge fairing 92b extend only partially along the blade spar 90 and secure only to the tip jet attachment fitting 94. As noted in the foregoing embodiments, the leading and trailing fittings 92a, 92b may secure to the tip jet attachment fitting 94. They may attach by means of removable fasteners such as screws, bolts, or the like.

Removability of the fittings 92a, 92b advantageously enables servicing of lines 108 passing through the fairings 92a, 92b. In such embodiments, the leading and trailing edge fairings 92a, 92b include a fitting portion 230 coextensive with the tip jet attachment fitting 94. It coextends along the longitudinal axis 96 and a spar portion 232 extending proximally beyond the tip jet attachment fitting 94 along the longitudinal axis 96.

Figure 16:
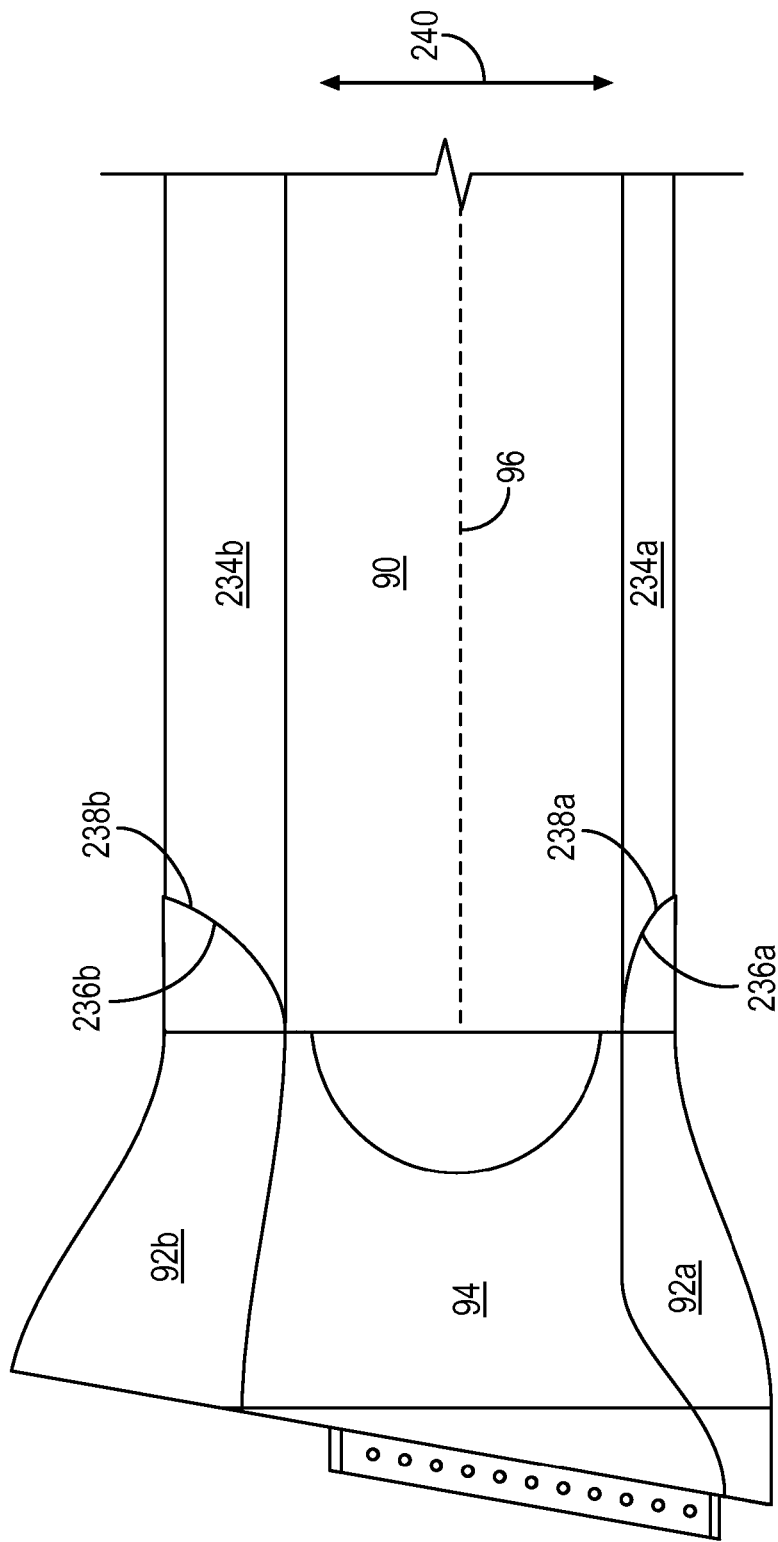
FIG. 16 is a top plan view of a blade spar and tip jet attachment fitting having detachable leading and trailing edge fairings in accordance with the present invention.

Referring to FIG. 16, in embodiments where the leading and trailing edge fittings 92a, 92b secure only to the tip jet attachment fitting 94, a leading edge fairing 234a and trailing edge fairing 234b may secure to the blade spar 90 and extend along a major portion thereof. In such embodiments, the leading and trailing fairings 92a, 92b may include edges 236a, 236b, respectively, conforming to corresponding distal edges 238a, 238b formed on the leading and trailing fairings 234a, 234b, respectively.

The edges 236a, 236b and edges 238a, 238b preferably have an extent both along the longitudinal axis 96 and along a transverse direction 240 perpendicular to the longitudinal axis. This helps to avoid an abrupt change in cross section of the assembly at a single position on the longitudinal axis 96. In the illustrated embodiment, the edges 236a, 236b diverge from one another with distance from the fitting 94. The edges 238a, 238b converge toward one another with proximity to the fitting 94.

However, the reverse of this arrangement is also suitable. The edges 236a, 236b may be separated from the edges 238a, 238b, respectively, by a small gap or may have a slight interference fit such that one or both of the leading trailing fairings 92a, 92b and the leading and trailing edge fairings 234a, 234b deforms slightly when assembled in order to reduce or eliminate a gap therebetween.

Figure 17:
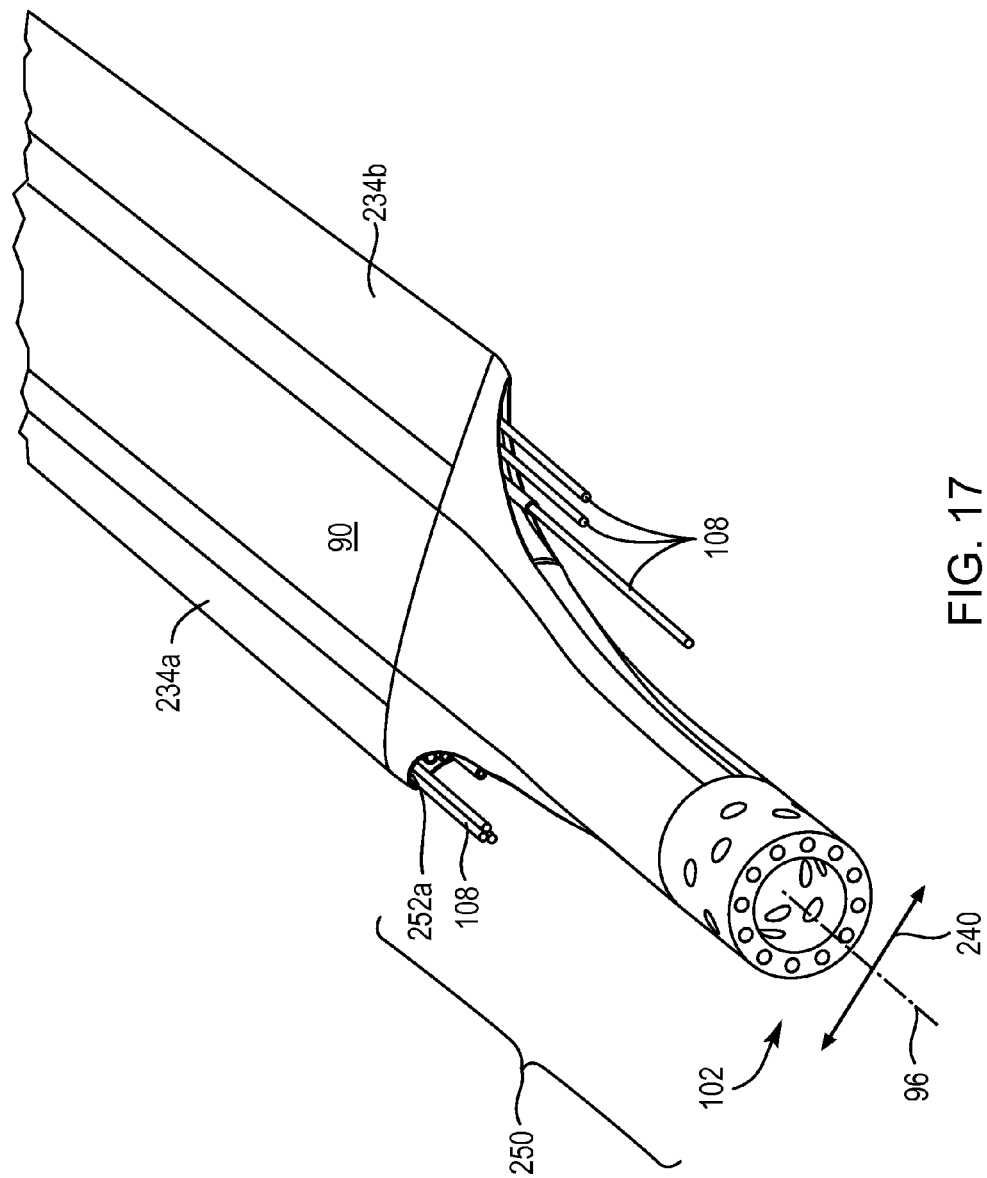
FIG. 17 is an isometric view of a proximal portion of a rotor blade in accordance with the present invention.

Referring to FIG. 17, in some embodiments, the leading and trailing fairings 234a, 234b are not coextensive with a root portion 250 of the blade spar 90 along the longitudinal axis 96. Such a configuration may advantageously expose the lines 108 passing through the leading and trailing fairings 234a, 234b to facilitate servicing and replacement of the lines 108. In such embodiments, the leading and trailing fairings 234a, 234b include proximal edges 252a, 252b, respectively, offset from the proximal end 102.

As with the proximal edges 238a, 238b, the proximal edges 252a, 252b have an extent both along the longitudinal axis 96 and along a transverse direction 240 perpendicular to the longitudinal axis in order to avoid an abrupt change in cross section of the assembly at a single position on the longitudinal axis 96. In the illustrated embodiment, the proximal edges 252a, 252b diverge from one another with distance from the proximal end 102 of the blade spar 90.

Figure 18:
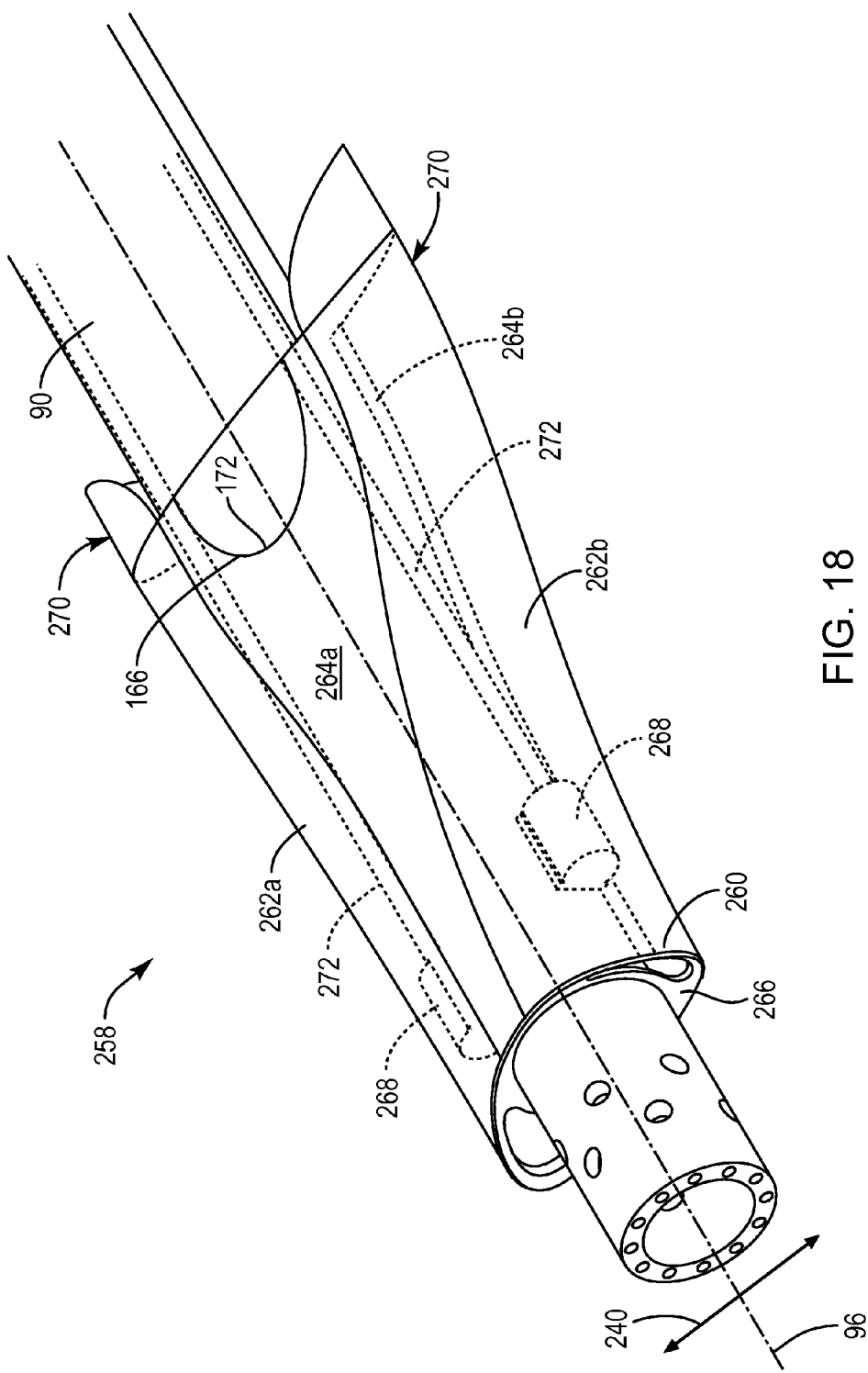
FIG. 18 is an isometric view of root fairing assembly in accordance with the present invention.

Referring to FIG. 18, in some embodiments, a root fairing assembly 258 secures to the root portion 250 of the blade spar 90. The root fairing assembly 258 includes a hub plate 260, a leading edge fairing 262a, a trailing edge fairing 262b, an upper plate 264a, and a lower plate 264b. The blade spar 90 passes through the hub plate 260 and the hub plate 260 includes a seat 266 for engaging the hub 44 or a shroud covering the hub 44.

The upper and lower plates 264a, 264b may secure to the hub plate 260 or each of the plates 260, 264a, 264b may independently secure to the blade spar 90 by means of an adhesive. In either case, the upper and lower plates 264, 264b are bonded to the surface of the blade spar 90. The upper and lower plates 264a, 264b secure to the blade spar 90 opposite one another and provide a structure for receiving removable fasteners securing the leading and trailing edge fairings 262a, 262b to the upper and lower plates 264a, 264b. In this manner, the structural strength of the blade spar 90 is not reduced by forming apertures therein for receiving fasteners. The leading and trailing edge fairings 262a, 262b may also secure to the hub plate 260 by means of removable fasteners.

In the illustrated embodiment, one or more actuators 268 secure to the upper and lower plates 264a, 264b. The one or more actuators 268 may be secured to the upper and lower plates 264a, 264b by means of flanges 270. Actuators 268 may actuate a cable 272 for controlling the tip jet 50. Securing an actuator 268 to the blade spar 90 by means of the upper and lower plates 264a, 264b may advantageously reduce undesired tensioning or relaxing of the cable 272 due to rotation or flexing of the blade spar 90, as might occur if the actuator 268 were secured to the hub 44.

The actuator 268 and cable 272 may advantageously be positioned coextensive with the neutral axis of the blade spar 90, or of the combined blade spar 90 and any structure or fairing secured thereto as described herein. The neutral axis may be the neutral axis for bending due to flapping and coning deflection of the blade 42 as known in the art of rotorcraft design. In some embodiments, lines 108, either in combination or in addition to the cables 272, may pass through apertures 274 formed in the hub plate 260.

Figure 19:
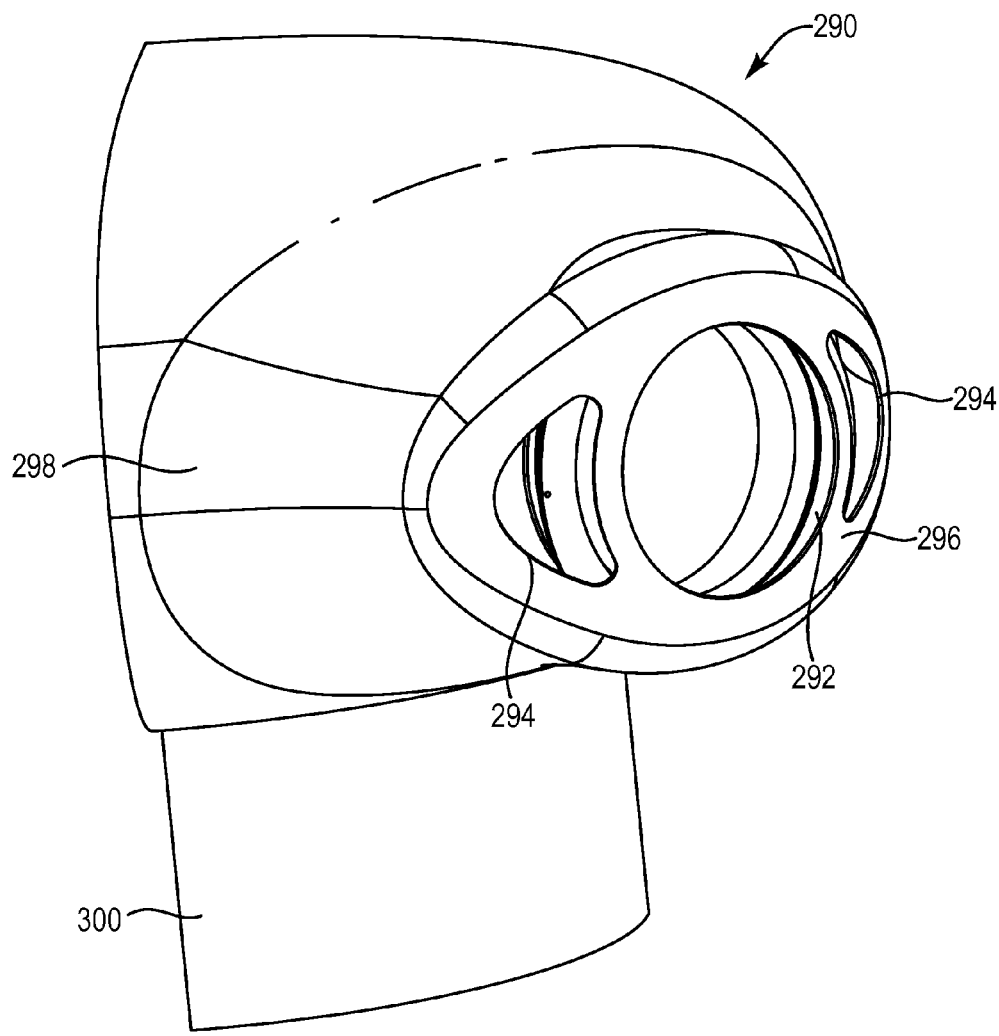
FIG. 19 is a cutaway isometric view of a hub shroud in accordance with the present invention.

Referring to FIG. 19, a hub shroud 290 may cover all or part of the hub 44 and mast 46. The hub shroud 290 includes spar apertures 292 through which the blade spars 90 pass. The spar apertures 292 may be surrounded by a spherical surface 296. The spherical surface may also define apertures 294 to permit lines 108 to pass from the hub 44 to the tip jets 50.

The hub shroud 290 may include a hub portion 298 conforming to the dimensions of the hub, with some gap between the hub 44 and shroud 90. The hub shroud 290 may also include a mast portion 300 extending from the hub portion 298 partially or completely along the mast 46. The hub shroud 290 may advantageously reduce the coefficient of drag of one or both of the hub 44 and mast 46.

Figure 20:
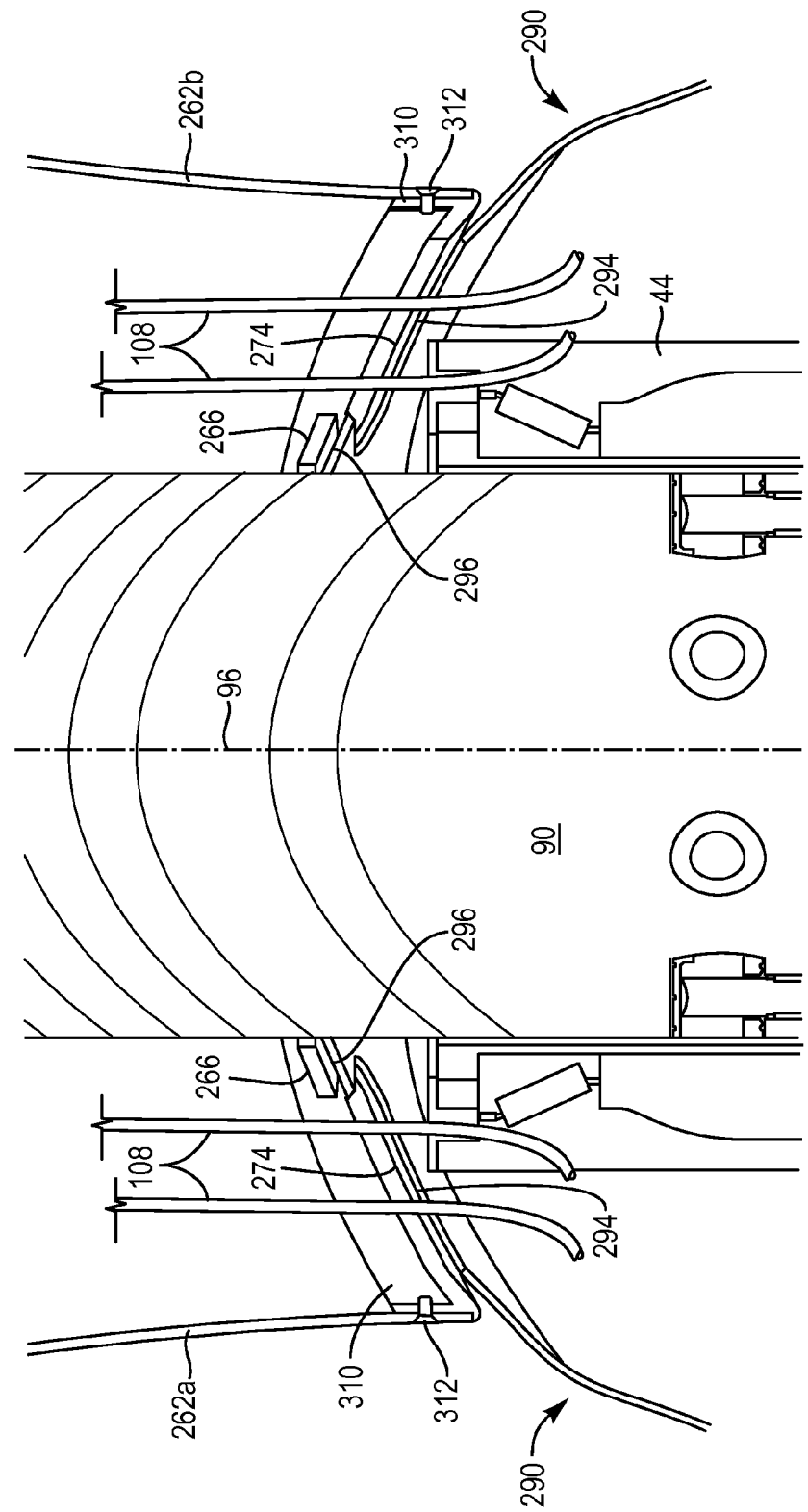
FIG. 20 is a partial, top cross sectional view of a hub, hub shroud, and root fairing assembly in accordance with the present invention.

Referring to FIG. 20, when assembled, the seat 266 of the root fairing assembly 258 is positioned adjacent the spherical surface 296. The seat 266 may also have a spherical contour and either contact the spherical surface 296 or be separated therefrom by a small gap, which may be partially or completely occupied by a lubricant. Alternatively, the seat 266 and spherical surface 296 may be coated with, or formed of, a low friction material. The combination of spherical seat 266 and spherical surface 296 may advantageously reduce deformation of one or both of the hub shroud 298 and root fairing assembly 258 due to feathering of the blade 42, flexing of the blade spar 90 due to flapping and coning of the blade 42, and flexing of the blade spar 90 due to lead-lag loading of the blade 42.

As is apparent from FIG. 20, the apertures 274 of the seat 266 and the apertures 294 of the spherical surface 296 are completely or partially aligned such that the lines 108 may pass therethrough. The apertures 274, 294 are preferably sized such that the lines 108 may fit therethrough despite substantial misalignment due to relative movement of the seat 266 and the spherical surface 296.

In some embodiments, the hub plate 260 may include one or more flanges 310 extending distally from the hub plate 260 along the longitudinal axis 96. The flanges 310 may engage a concave inner surface or a convex outer surface of the leading and trailing edge fairings 262a, 262b. The flanges 310 may secure to the leading and trailing edge fairings 262a, 262b by means of removable fasteners 312, such as screws, bolts, or the like. Alternatively, the flanges 310 may serve simply to support and align the leading and trailing edge fairings 262a, 262b, which are retained by means of removable fasteners securing the leading and trailing edge fairings to the upper and lower plates 264a, 264b.

Figure 21:
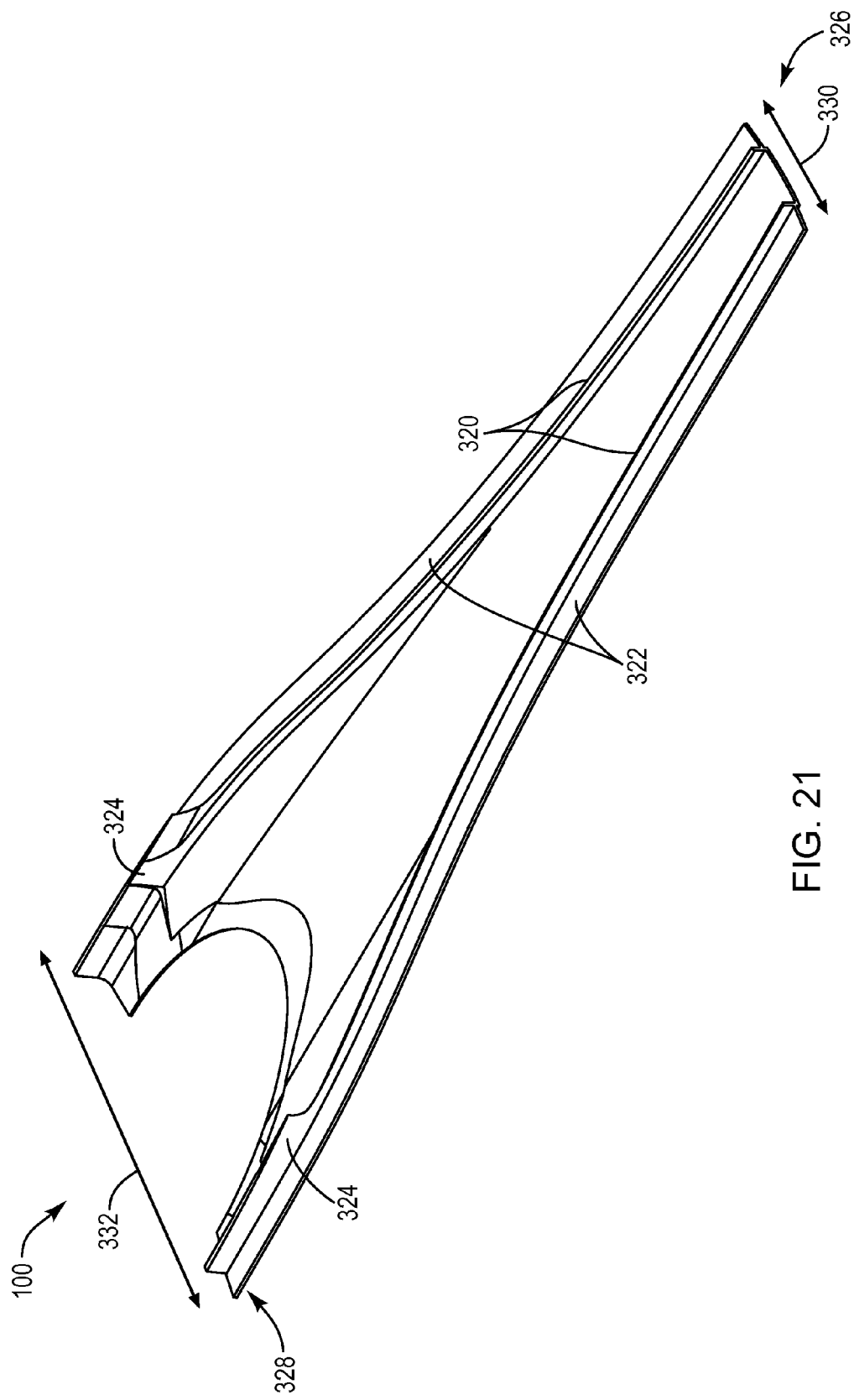
FIG. 21 is an isometric view of mounting plate of a root fairing assembly in accordance with the present invention.

Referring to FIG. 21, the upper and lower plates 264a, 264b may have the configuration illustrated. They may be substantially mirror images of one another. The exceptions are that the outer surface of the upper plate 264a forms part of the upper surface of an airfoil contour formed by the upper plate 264a, and the leading and trailing edge fairings 262a, 262b and the outer surface of the lower plate 264b forms part of the lower surface of the same airfoil contour.

Inner flanges 320 may secure to the plates 264a, 264b and project outwardly from an inner surface thereof. The plates 264a, 264b may also include outer flanges 322 projecting outwardly from the plates 264a, 264b. The plates 264a, 264b may additionally include sidewalls 324 of similar orientation to the flanges 320 but projecting outwardly further than the flanges 320. In the illustrated embodiment, the flanges 322 extend partially from the proximal end 326 toward the distal end 328. By contrast, the sidewalls 324 extend partially from the distal end 328 toward the proximal end 326 such that a transition between the flanges 320 and the sidewalls 324 occurs between the proximal end 326 and the distal end 328. The transition may be smooth such that there is no abrupt change in cross section that would lead to stress concentrations.

The plates 264a, 264b may be sized to conform to changes in the cross sectional shape of the blade spar 90. Accordingly, the proximal end 326 may have a width 330 substantially greater than the width 332 of the distal end 328. As previously noted, the upper and lower plates 264a, 264b may define a registration surface extending partially from the distal end 328 toward the proximal end 326.

Figure 22:
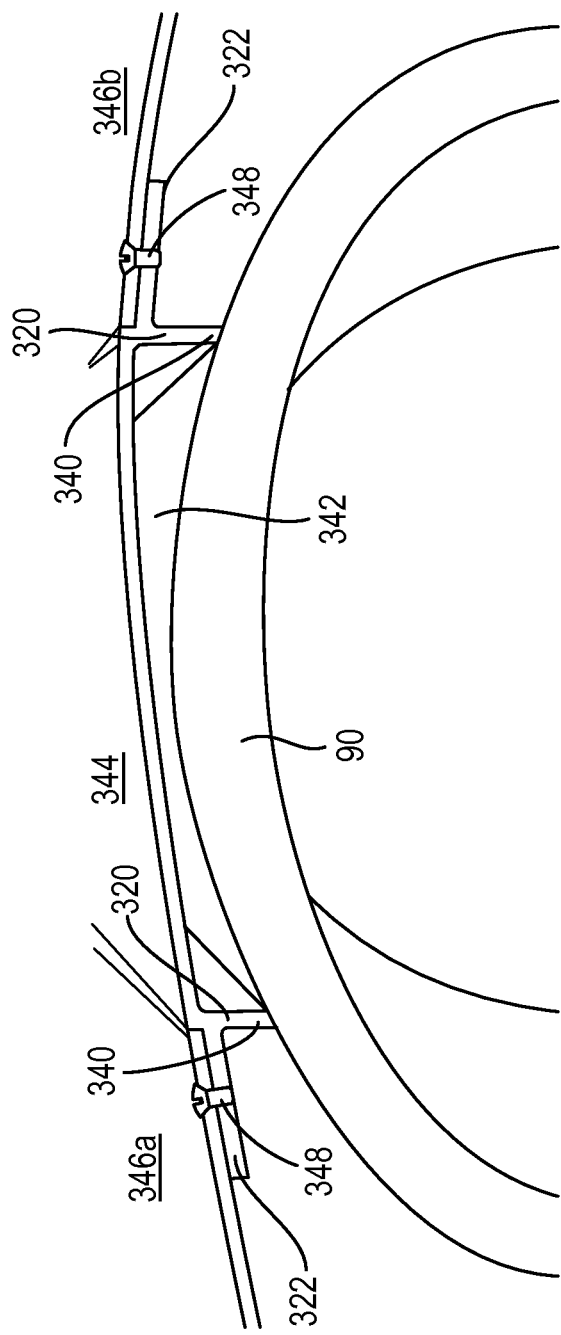
FIG. 22 is a front elevation cross sectional view of a blade spar and root fairing assembly in accordance with the present invention.
Figure 23:
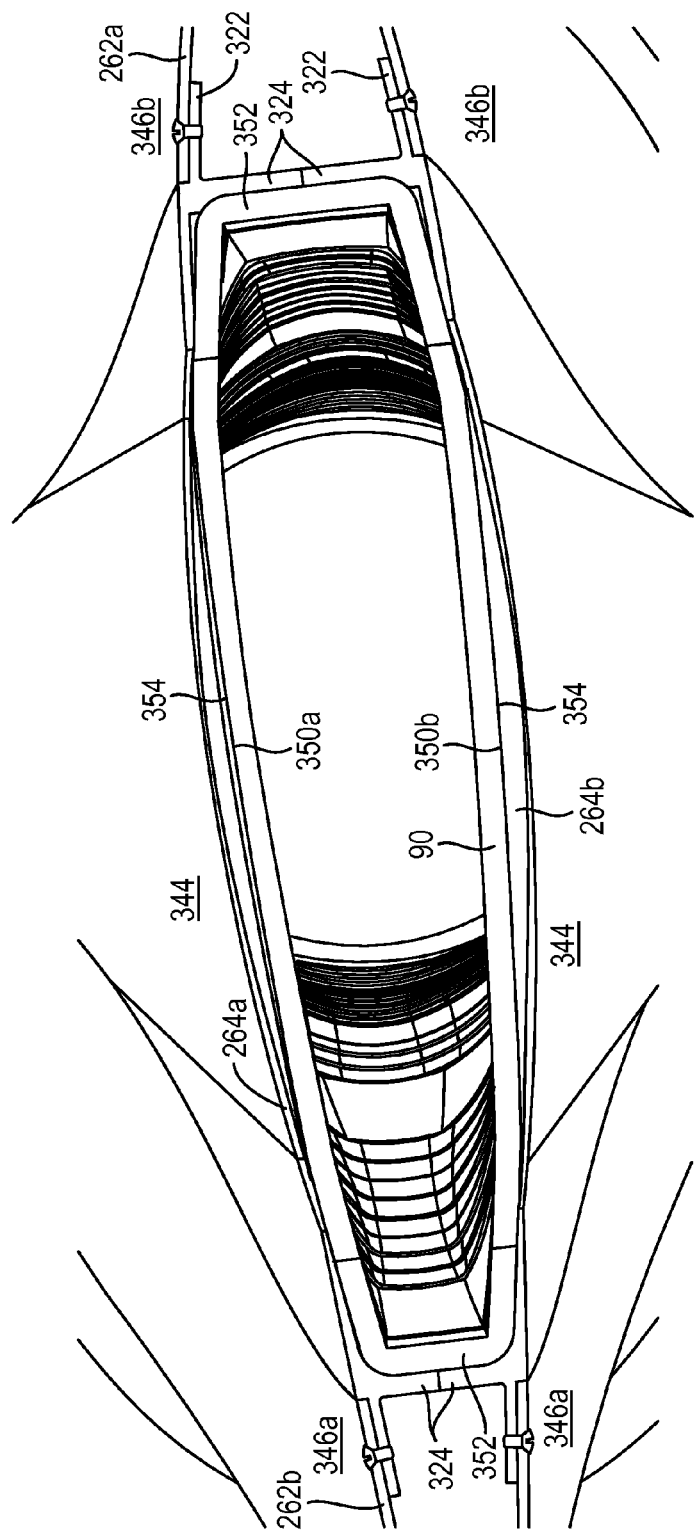
FIG. 23 is a front elevation cross sectional view of a blade spar and root fairing assembly in accordance with the present invention.

The orientation, dimensions, and functions of the flanges 320, 322 and sidewalls 324 are illustrated in FIGS. 22 and 23. Referring specifically to FIG. 22, the flanges 320 extend substantially perpendicularly from the inner surface of the plates 264a, 264b and include a bonding surface 340, which may have a contour and orientation corresponding to the outer surface 342 of the blade spar 90 engaged thereby. The flanges 320 may engage a portion of the blade spar 90 having a generally cylindrical or elliptical outer surface 342.

The flanges 322 may be oriented tangent to the outer surface 344 of the plates 264a, 264b. The flanges 322 may be offset from the outer surface 344. Thereby, the outer surfaces 346a, 346b of the leading and trailing edge fairings 262a, 262b are flush with the outer surface 344 of the plates 264a, 264b. The leading and trailing edge fairings 262a, 262b may secure to the flanges 322 by means of fasteners 348 such as screws, bolts, or other removable fasteners.

Referring specifically to FIG. 23, the sidewalls 324 may engage portions of the tubular blade spar 90 having a box-like cross section, though the sides of the box may be substantially curved and the corners rounded. In the illustrated embodiment, the portion of the blade spar 90 coextensive along the longitudinal axis with the sidewalls 324 may include an upper surface 350a, a lower surface 350b, and lateral sides 352. The sidewalls 324 engage the lateral sides 352.

As is apparent in FIG. 23, the sidewalls 352 of the upper and lower plates 364a, 364b may abut one another when in place opposite one another having the blade spar 90 captured therebetween. In the illustrated embodiment, inner surfaces 354 of the upper and lower plates 364a, 364b engage the upper and lower surfaces 350a, 350b respectively of the blade spar 90 and may be secured thereto by means of adhesive. Adhesive may likewise bond the sidewalls 324 to the lateral sides 352.

Figure 24:
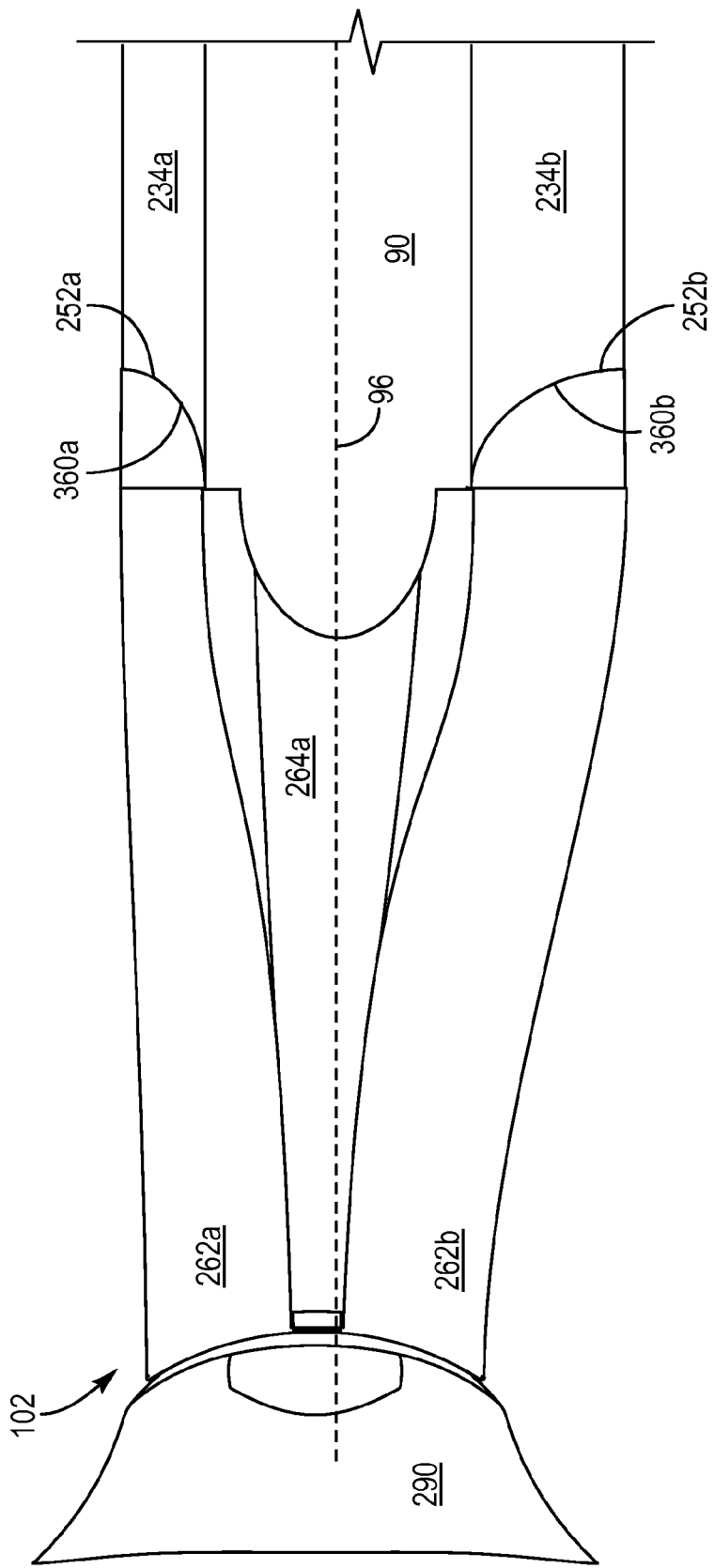
FIG. 24 is a top plan view of a root fairing assembly in accordance with the present invention.

Referring to FIG. 24, the leading and trailing edge fairings 262a, 262b may secure to the upper and lower plates 364a, 364b such that the leading and trailing edge fairings 262a, 262b abut the proximal edges 252a, 252b of the leading and trailing edge fairings 234a, 234b coextensive with the blade spar 90 along a major portion of the length thereof. As in other interfaces between sections of the leading and trailing edge fairings, the edges 360a, 360b of the leading and trailing edge fairings 262a, 262b may have an extent both along the longitudinal axis 96 and the transverse direction 240. In the illustrated embodiment, the edges 360a, 360b diverge from one another with distance from the proximal end 102 of the blade spar 90 along the longitudinal axis.

Figure 25:
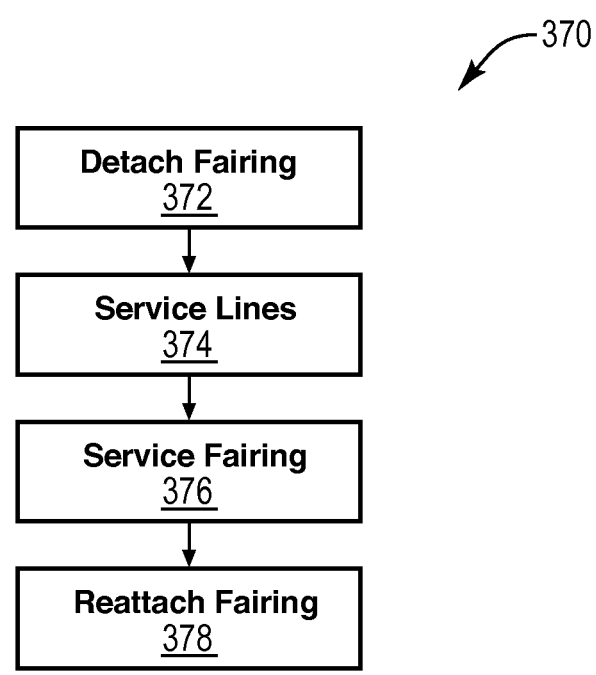
FIG. 25 is a process flow diagram of a method for servicing a control line mounted within a rotor blade fairing in accordance with the present invention.

Referring to FIG. 25, a process flow diagram is shown for a method 370 or process 370 for servicing a control line mounted within a rotor blade fairing in accordance with the present invention. The process 370 includes detaching 372 the fairing, servicing 374 the lines, servicing 376 the fairing, and then reattaching 378 the fairing.

The present invention may be embodied in other specific forms without departing from its fundamental principles or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A rotorcraft rotor comprising:
a hub configured to rotationally mount to a mast of a rotorcraft; and
a plurality of rotor blades, each rotor blade comprising rotatably mounted to the hub;
leading edge fairing being mounted to the blade spar such that the leading edge fairing extends along a major portion of the blade spar;
a trailing edge fairing mounted to the blade spar such that the trailing edge fairing extends along a major portion of the blade spar and is located opposite the leading edge fairing secured to the blade spar and such that the blade spar, leading edge fairing, and trailing edge fairing form an airfoil contour along the length of the leading edge fairing;
at least one line formed to do at least one of extending between the leading edge fairing and the blade spar and extending between the trailing edge fairing and the blade spar; and
one or more detachable fairings, each of the detachable fairings being selectively securable to the blade spar and one of the leading and trailing edge fairings being flush with one of the leading and trailing edge fairings such that the blade spar and one or more detachable fairings form an airfoil contour;
wherein each rotor blade further comprises
the blade spar comprising a proximal end and a distal end, the blade spar pivotably secured to the hub at the proximal end; and
each of the one or more detachable fairings extending between a distal end of one of the leading and trailing edge fairings and the distal end of the blade spar.

2. The rotorcraft of claim 1, wherein each rotor blade further comprises:
a tip jet attachment fitting secured to the distal end of the blade spar, the tip jet attachment fitting adapted to mount a tip jet to the blade spar; and
each of the one or more detachable fairings selectively securable to the tip jet attachment fitting.

3. The rotorcraft of claim 2, wherein each rotor blade further comprises the one or more detachable fairings and the tip jet attachment fitting forming an airfoil contour.

4. The rotor craft of claim 1, wherein each rotor blade further comprises:
at least one of the leading and trailing edge fairings comprising a tapered portion extending proximally from the distal end thereof; and
the one or more detachable fairings comprising a tapered portion shaped to mate with the tapered portion of at least one of the leading and trailing edge fairings.

5. The rotorcraft of claim 1, wherein each rotor blade further comprises:
each of the one or more detachable fairings being positioned between a proximal end of one of the leading and trailing edge fairings and the proximal end of the blade spar.

6. The rotorcraft of claim 5, wherein each rotor blade further comprises:
at least one of the leading and trailing edge fairings comprising a tapered portion extending distally from the proximal end thereof; and
the one or more detachable fairings comprising a tapered portion shaped to mate with the tapered portion of at least one of the leading and trailing edge fairings.

7. The rotorcraft of claim 5, wherein each rotor blade further comprises:
a mounting structure secured to the blade spar; and
the one or more detachable fairings secure to the blade spar by means of the mounting structure.

8. The rotorcraft of claim 7, wherein each rotor blade further comprises:
the mounting structure comprising an upper plate and a lower plate; and
the one or more detachable fairings securing to both the upper plate and lower plate, such that the one or more detachable fairings and the upper and lower plates form an airfoil contour.

9. The rotorcraft of claim 8, further comprising:
a hub shroud positioned around the hub, the hub shroud including a spherical surface having a plurality spar apertures formed therein;
each blade spar further extending through each spar aperture, respectively;
each mounting structure further including a spherical seat interfacing with the spherical surface; and
proximal ends of each detachable fairing further securing to each spherical seat.

10. The rotorcraft of claim 9, wherein each spherical seat defines at least one line aperture and each line extends through each ene line aperture, respectively.

11. The rotorcraft of claim 8, wherein each rotor blade further comprises:
at least one actuator secured to at least one of the upper and lower plates;
at least one control cable coupled to the actuator and extending between one of the leading and trailing edge fairings and the blade spar.

12. The rotorcraft of claim 11, wherein each rotor blade further comprises the control cable being intersected by a neutral bending plane of the combined blade spar and leading and trailing edge fairings.

13. The rotorcraft of claim 8, wherein each rotor blade further comprises:
the blade spar comprising an upper registration surface and a lower registration surface; and
the upper and lower plates each including a mating surface, the mating surface of the upper plate engaging the upper registration surface and the mating surface of the lower plate engaging the lower registration surface.

14. The rotorcraft of claim 13, wherein each rotor blade further comprises the upper and lower registration surfaces comprising surfaces extending radially outward from a center of the blade spar.

15. The rotorcraft of claim 14, wherein each rotor blade further comprises:
the blade spar defining a longitudinal direction extending between the proximal and distal ends; and
the upper and lower registration surfaces extending both perpendicular and parallel to the longitudinal direction.

16. A method for servicing a rotor blade comprising:
removing a detachable portion of one of a leading edge fairing and a trailing edge fairing from a rotor blade, the rotor blade including:
a blade spar adapted to rotatably mount to a hub of a rotorcraft, the leading and trailing edge fairings being mounted to the blade spar; and
control lines extending between the blade spar and at least one of the leading and trailing edge fairings;
servicing one or more of the control lines; and
reattaching the portion of the one of the trailing edge fairing and the leading edge fairing.

17. The method of claim 16, wherein:
the blade spar comprises a proximal end and a distal end;

the leading and trailing edge fairings further comprise a major portion secured to the blade spar and extending along a major portion of the longitudinal extent thereof; and the detachable portion extends between a distal end of the major portion of one of the leading and trailing edge fairings and the distal end of the blade spar.

18. The method of claim 17, wherein:

the blade further comprises a tip jet attachment fitting secured to the distal end of the blade spar, the tip jet attachment fitting adapted to mount a tip jet to the blade spar; and removing the detachable portion of one of the leading edge fairing and trailing edge fairing further comprises releasing fasteners securing the detachable portion to the tip jet attachment fitting.

19. The method of claim 16, wherein:

the blade spar comprises a proximal end and a distal end;

the leading and trailing edge fairings further comprise a major portion secured to the blade spar and extending along a major portion of the longitudinal extent thereof; and the detachable portion extends proximally from the proximal end of the major portion of one of the leading and trailing edge fairings toward the proximal end of the blade spar.

\* \* \* \* \*